US012705855B2

(12) United States Patent
Yamaguchi et al.

(10) Patent No.: US 12,705,855 B2
(45) Date of Patent: Aug. 11, 2026

(54) INFORMATION PROCESSING APPARATUS, INFORMATION PROCESSING SYSTEM AND METHOD FOR PROCESSING INFORMATION

(71) Applicant: SONY GROUP CORPORATION, Tokyo (JP)

(72) Inventors: Takashi Yamaguchi, Tokyo (JP); Yugo Katsuki, Tokyo (JP); Shinji Katsuki, Tokyo (JP); Takanori Fukazawa, Tokyo (JP); Hiroyasu Baba, Tokyo (JP); Hiroshi Yoshida, Tokyo (JP); Fumisada Maeda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 302 days.

(21) Appl. No.: 18/559,648

(22) PCT Filed: Feb. 22, 2022

(86) PCT No.: PCT/JP2022/007083

§ 371 (c)(1),
(2) Date: Nov. 8, 2023

(87) PCT Pub. No.: WO2022/249593

PCT Pub. Date: Dec. 1, 2022

(65) Prior Publication Data

US 2024/0233310 A1 Jul. 11, 2024

(30) Foreign Application Priority Data

May 27, 2021 (JP) ................................ 2021-089350

(51) Int. Cl.

*G06V 10/25* (2022.01)
*G06T 7/20* (2017.01)
*G06V 10/60* (2022.01)

(52) U.S. Cl.

CPC ................ *G06V 10/25* (2022.01); *G06T 7/20* (2013.01); *G06V 10/60* (2022.01)

(58) Field of Classification Search

CPC .......... G06V 10/25; G06V 10/60; G06T 7/20; G06T 7/254; H04N 25/44; H04N 23/60; G01S 17/89

See application file for complete search history.

(56) References Cited

U.S. PATENT DOCUMENTS

2018/0062691 A1* 3/2018 Barnett, Jr. ............. G06F 3/167
2020/0398797 A1* 12/2020 Herman ............... H04N 23/811

(Continued)

FOREIGN PATENT DOCUMENTS

JP 2013-022427 A 2/2013
JP 2020-162000 A 10/2020
JP 2020161992 A * 10/2020 ............ H04N 23/60

OTHER PUBLICATIONS

International Search Report and Written Opinion of PCT Application No. PCT/JP2022/007083, issued on May 17, 2022, 09 pages of ISRWO.

*Primary Examiner* — Syed Haider
(74) *Attorney, Agent, or Firm* — CHIP LAW GROUP

(57) ABSTRACT

Provided is an information processing apparatus including a controller and a processor. The controller controls one of a first sensor and a second sensor based on sensing data output from the other. The first sensor detects light emitted from an object and the second sensor detects a change in luminance value of the light as an event. The processor processes the sensing data output from the first sensor or the second sensor.

18 Claims, 20 Drawing Sheets

(56) References Cited

U.S. PATENT DOCUMENTS

| | | | | |
|---|---|---|---|---|
| 2022/0166958 | A1* | 5/2022 | Hoshino | H04N 23/60 |
| 2022/0201204 | A1* | 6/2022 | Hirata | H04N 25/50 |

* cited by examiner

5100
CCU
LIGHT SOURCE DEVICE
ARM CONTROL DEVICE
INPUT DEVICE
SURGICAL TOOL CONTROL DEVICE
SMOKE EVACUATION DEVICE
RECORDER
PRINTER
5153
5157
5159
5161
5163
5165
5167
5169
5151
5155
5111
5113
5115
5117
5119
5131
5133
5135
5137
5139a
5139b
5139c
5139d
5141
5143
5145
5147a
5147b
5147c
5149a
5149b
5171
5181
5183
5185
5187
5189
5191

FIG.10

RGB IMAGE

EVS IMAGE

Step S101

Step S102

Step S104

Step S105

Step S107

900
906
901
CPU
902
ROM
903
RAM
904
STORAGE DEVICE
905
COMMUNICA-TION MODULE
907
SENSOR MODULE
908
RANGING MODULE
909
IMAGE PICKUP DEVICE
910
DISPLAY DEVICE
911
SPEAKER
912
MICROPHONE
913
INPUT DEVICE 10c
400a
410
OUTPUT UNIT
600
VARIOUS SENSORS
408
PROCESSOR
406
CONTROLLER
404
CORRECTION UNIT
402
ACQUISITION UNIT
100
RGB SENSOR
200
EVS
500
ToF SENSOR

INFORMATION PROCESSING APPARATUS, INFORMATION PROCESSING SYSTEM AND METHOD FOR PROCESSING INFORMATION

CROSS REFERENCE TO RELATED APPLICATIONS

This application is a U.S. National Phase of International Patent Application No. PCT/JP2022/007083 filed on Feb. 22, 2022, which claims priority benefit of Japanese Patent Application No. JP 2021-089350 filed in the Japan Patent Office on May 27, 2021. Each of the above-referenced applications is hereby incorporated herein by reference in its entirety.

FIELD

The present disclosure relates to an information processing apparatus, an information processing system, and a method for processing information.

BACKGROUND

In recent years, image recognition, image analysis, and the like of an image captured by an image sensor to extract a subject of interest, to analyze motions of the subject, and to perform machine learning have gained widespread use. Furthermore, results obtained by such an analysis are to be used for medical diagnosis, skills acquisition, and the like, which creates strong demand for enhancement in accuracy of the analysis.

CITATION LIST

Patent Literature

Patent Literature 1: JP 2013-22427 A

SUMMARY

Technical Problem

In order to enhance accuracy of image analysis, needless to say, enhancement in quality of an image used for analysis is a conceivable solution, and an increase in data volume of the image used for analysis is also a conceivable solution. However, increasing a data volume of an image increases time and processing load required for analysis and brings such a counterproductive result that real-time analysis becomes difficult to perform due to difficulties in immediately notifying a user of analysis results after capturing an image of a subject.

Therefore, the present disclosure proposes an information processing apparatus, an information processing system, and a method for processing information that enable reduction in data volume of an image used for analysis.

Solution to Problem

According to the present disclosure, there is provided an information processing apparatus including: a controller configured to control one of a first sensor and a second sensor based on sensing data output from the other, the first sensor being configured to detect light emitted from an object and the second sensor being configured to detect a change in luminance value of the light as an event; and a processor configured to process the sensing data output from the first sensor or the second sensor.

Furthermore, according to the present disclosure, there is provided an information processing system including: a first sensor configured to detect light emitted from an object; a second sensor configured to detect a change in luminance value of the light as an event; and an information processing apparatus. In the information processing system, the information processing apparatus includes: a controller configured to control one of the first sensor and the second sensor based on sensing data output from the other, and a processor configured to process the sensing data output from the first sensor or the second sensor.

Furthermore, according to the present disclosure, there is provided a method for processing information by an information processing apparatus. The method includes: controlling one of a first sensor and a second sensor based on sensing data output from the other, the first sensor being configured to detect light emitted from an object and the second sensor being configured to detect a change in luminance value of the light as an event; and processing the sensing data output from the first sensor or the second sensor.

BRIEF DESCRIPTION OF DRAWINGS

FIG. 10 is a view for describing Example 1 (part 1).

DESCRIPTION OF EMBODIMENTS

Figure 1:
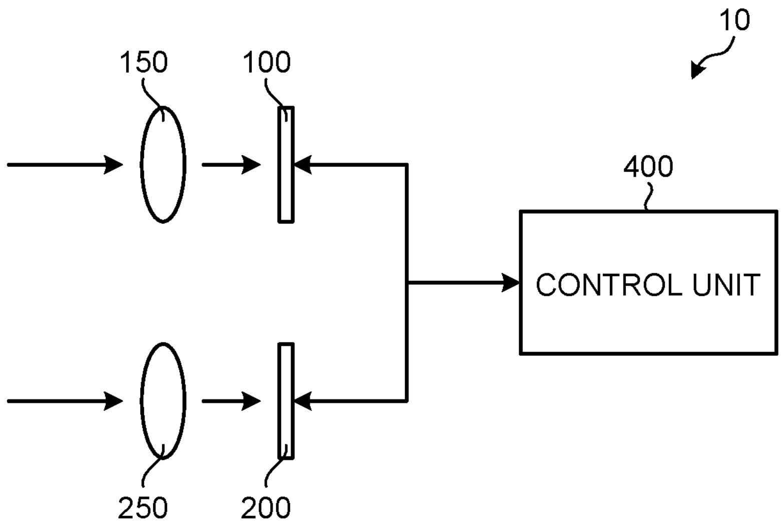
FIG. 1 is a view illustrating an exemplary configuration of an information processing system 10 according to an embodiment of this disclosure.

Hereinafter, preferred embodiments of this disclosure will be described in detail with reference to the accompanying drawings. Note that, in the specification and the drawings, components having substantially the same functional configurations are denoted by the same reference numerals, and redundant descriptions are omitted. In addition, in the specification and the drawings, a plurality of components having substantially the same or similar functional configurations may be distinguished by attaching different alphabets after the same reference numeral. However, the components having substantially the same or similar functional configurations are denoted with the same reference numeral unless it is necessary to distinguish one from another.

The explanation is given in the following order.

1. Background of Invention of Embodiment According to Disclosure
2. Embodiment
2.1 Outline of Information Processing System 10 According to Embodiment
2.2 Configuration of EVS 200
2.3 Configuration of Control Unit 400
3. Examples According to Embodiment
3.1 Example 1
3.2 Example 2
3.3 Example 3
3.4 Example 4
4. Summary
5. Hardware Configuration
6. Supplement

1. Background of Invention of Embodiment According to Disclosure

Before describing embodiments according to this disclosure, hereinafter described first is the background of the embodiments according to this disclosure created by the inventors.

In recent years, image recognition, image analysis, and the like of an image captured by an image sensor to extract a subject of interest, to analyze motions of the subject, and to perform machine learning have gained widespread use. Furthermore, results obtained by such an analysis are to be used for medical diagnosis, skills acquisition, and the like, which creates strong demand for enhancement in accuracy of the analysis.

In order to enhance accuracy of image analysis, needless to say, enhancement in quality of an image used for analysis is a conceivable solution, and an increase in data volume of the image used for analysis is also a conceivable solution. However, increasing a data volume of an image increases time and processing load required for analysis and brings such a counterproductive result that real-time analysis becomes difficult to perform due to difficulties in immediately notifying a user of analysis results after capturing an image of a subject.

In order to reduce a data volume while maintaining a high quality of an image, image pickup requirements (such as sampling rate (frame rate), sampling time (exposure time), focus, and gain) of the image sensor are to be set appropriately. However, it is difficult to keep setting the image pickup requirements appropriately for a shifting subject. Still further, setting more image pickup requirements than necessary may increase processing load and power consumption in the image sensor and an image analysis device.

In light of these situations, the present inventors have studied a technique for reducing a data volume while maintaining a high quality of an image for analysis, thereby focusing on a unique use of an event vision sensor (EVS).

EVSs are image sensors that sensitively detect luminance changes and are higher in sensitivity than typical RGB sensors. Furthermore, EVSs have no concept of frame rate and are capable of outputting timestamp information and pixel information (position information of pixels) immediately when a luminance change exceeds a predetermined threshold. For this reason, EVSs are capable of outputting information according to frequent luminance changes, that is to say, EVSs are capable of capturing with high time resolution a minute change of a subject as needed.

Therefore, the inventors have invented embodiments of this disclosure in which an EVS is used to enable reduction in data volume while maintaining a high quality of an image for analysis.

An embodiment of this disclosure employs a sensor fusion technique using different types of sensors (for example, RGB sensor, EVS, and ToF sensor). Based on sensing data output from one of these sensors, another sensor of the remaining sensors is controlled, and based on sensing data output from another sensor of the remaining sensors, data for analysis is detected. Specifically, for example, in this embodiment, based on sensing data output from one of a plurality of sensors, for example, a region of interest (ROI), a time of interest (ROI), a sampling rate (frame rate), a sampling time (exposure time), and a gain of one of the remaining sensors are controlled. Furthermore, for example, in this embodiment, based on the sensing data output from one of the plurality of sensors, controlled are a threshold used for comparison with a luminance change when an event is detected by the EVS and an illumination intensity with respect to a subject. Alternatively, in this embodiment, for example, based on the sensing data output from one of the plurality of sensors, an image output from one of the remaining sensors corresponding to the sensing data is evaluated, and an image for analysis is selected according to the evaluated result. According to the embodiment of this disclosure, it is possible to reduce a data volume while maintaining a high quality of an image for analysis. Hereinafter, the embodiment of this disclosure created by the inventors will be described in detail.

In the following description, a region of interest (ROI) represents a region within an image to be captured by a sensor or a region within an image for processing, and the region includes an image of a subject (object). A time of interest (TOI) represents a time window to be captured by a sensor or a time window in which sensing data for processing is obtained, and the sensing data captured by the sensor in the time window includes an image of a subject (object) and data corresponding to a change of the subject.

2. Embodiment

2.1 Outline of Information Processing System 10 According to Embodiment

Figure 2:
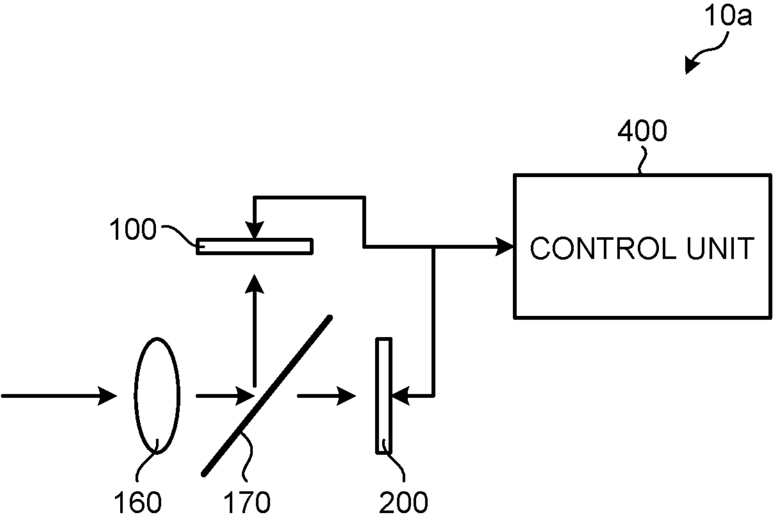
FIG. 2 is a view illustrating an exemplary configuration of an information processing system 10*a* according to the embodiment of this disclosure.

First, with reference to FIGS. 1 and 2, an exemplary configuration of an information processing system 10 according to the embodiment of this disclosure will be described. FIG. 1 is a view illustrating an exemplary configuration of the information processing system 10 according to the embodiment of this disclosure. FIG. 2 is a view illustrating an exemplary configuration of an information processing system 10*a* according to the embodiment of this disclosure.

As illustrated in FIG. 1, the information processing system 10 according to this embodiment includes a RGB sensor (first sensor) 100, an EVS (second sensor) 200, lenses 150 and 250, and a control unit (information processing apparatus) 400. Hereinafter, outlines of devices included in the information processing system 10 will be described in sequence.

(RGB Sensor 100)

The RGB sensor 100 is an image sensor capable of detecting emitted light from a subject (object) and outputting an image signal to acquire an image of the subject based on the emitted light from the subject. The image signal output from the RGB sensor 100 is output to the control unit 400 (to be described). Specifically, the RGB sensor 100 is an image sensor that enables color photography in which, for example, a plurality of pixels capable of detecting blue light, green light, red light is arranged according to a Bayer array. In this embodiment, note that a monochrome image sensor may be employed instead of the RGB sensor 100.

Furthermore, in this embodiment, together with the RGB sensor 100 or instead of the RGB sensor 100, for example, a time-of-flight (ToF) sensor may be used to measure a distance to the subject, using a return time of reflected pulsed light from the subject.

(EVS 200)

The EVS 200 detects a change in luminance value of the emitted light from the subject (object) as an event and outputs event data. The event data output from the EVS 200 is output to the control unit 400 (to be described). Details of the EVS 200 will be described later.

(Lenses 150 and 250)

The lenses 150 and 250 guide the emitted light from the subject to the RGB sensor 100 and the EVS 200, respectively. In the lenses 150 and 250, a plurality of lens including a zoom lens and a focus lens may be combined. In addition, the zoom lens and the focus lens may be movable along an optical axis in order to, for example, adjust a magnification and a focal point of an image.

(Control Unit 400)

The control unit 400 includes, for example, a central processing unit (CPU) and a graphics processing unit (GPU) and controls motions of the RGB sensor 100 and the EVS 200 overall. Details of the control unit 400 will be described later.

The information processing system 10 according to this embodiment may also have the configuration illustrated in FIG. 2. For example, the information processing system 10*a* illustrated in FIG. 2 includes the RGB sensor 100, the EVS 200, and the control unit 400 as similar to the configuration illustrated in FIG. 1. The information processing system 10*a* also includes a lens 160 and a beam splitter 170. Hereinafter, outlines of devices included in the information processing system 10*a* will be described in sequence, but devices common to FIG. 1 will be omitted.

(Lens 160)

The lens 160 guides emitted light from a subject to the beam splitter 170 (to be described). In the lens 160, a plurality of lens including a zoom lens and a focus lens may be combined as similar to the lenses 150 and 250.

(Beam Splitter 170)

The beam splitter 170 guides reflected light from the subject to both the RGB sensor 100 and the EVS 200. The beam splitter 170 may also be configured to adjust a distribution ratio of quantities of light incident on the RGB sensor 100 and the EVS 200.

In this embodiment, it should be noted that the configurations illustrated in FIGS. 1 and 2 are exemplary configurations of the information processing system 10, and the information processing system 10 is not limited to the configurations illustrated in FIGS. 1 and 2. For example, the information processing system 10 may include another sensor (third sensor). Alternatively, the RGB sensor 100 and the EVS 200 may be disposed on one substrate.

<2.2 Configuration of EVS 200>

Figure 3:
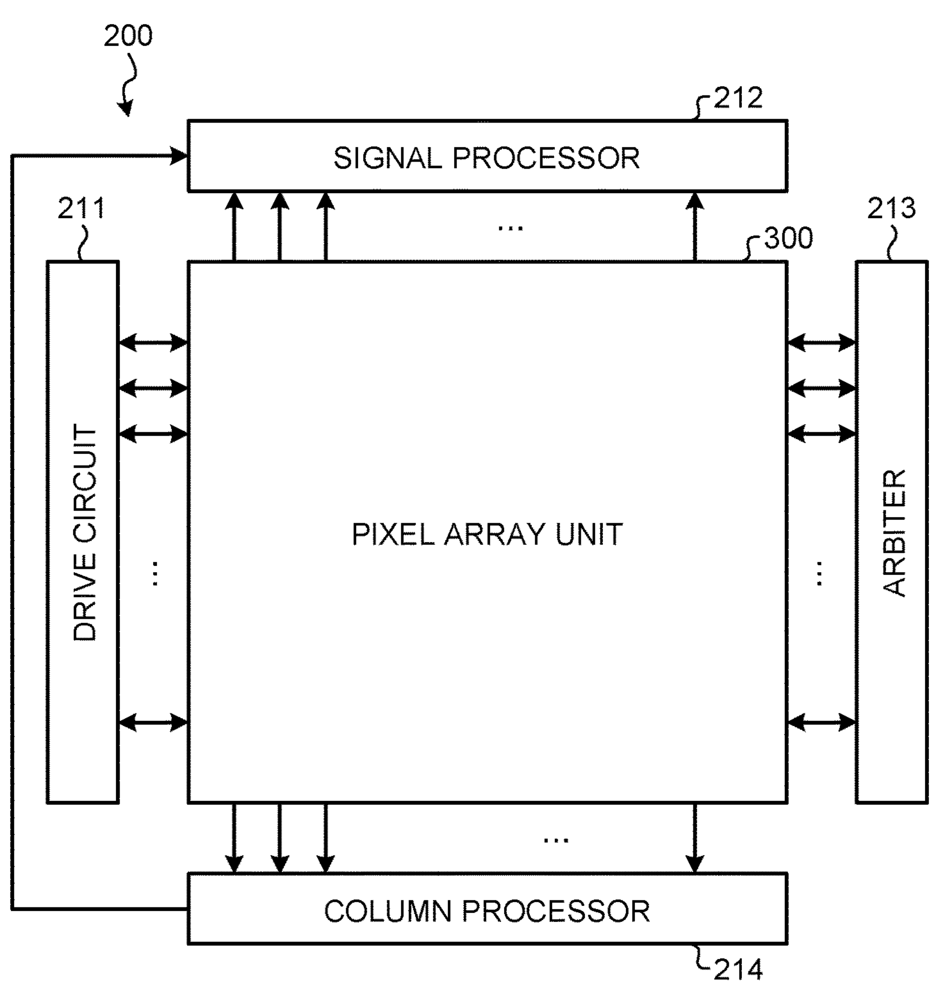
FIG. 3 is a block diagram illustrating an exemplary configuration of an EVS 200 used in the embodiment of this disclosure.
Figure 4:
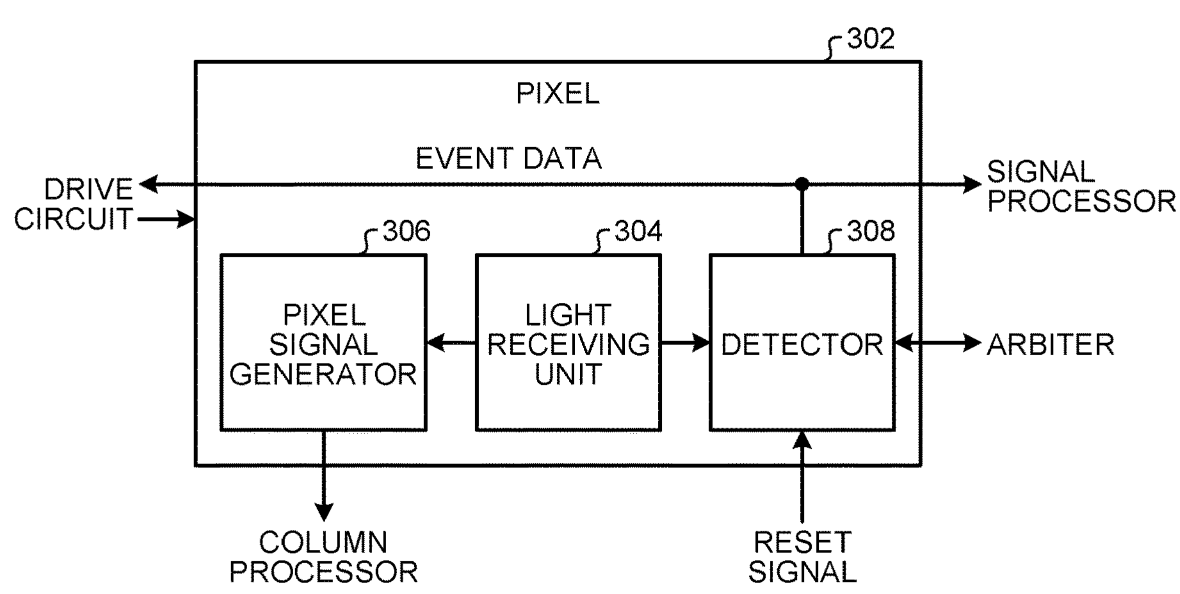
FIG. 4 is a block diagram illustrating an exemplary configuration of a pixel 302 located in a pixel array unit 300 in the EVS 200 illustrated in FIG. 3.

With reference to FIGS. 3 and 4, the EVS 200 will be described. FIG. 3 is a block diagram illustrating an exemplary configuration of the EVS 200 used in the embodiment of this disclosure. FIG. 4 is a block diagram illustrating an exemplary configuration of a pixel 302 located in a pixel array unit 300 in the EVS 200 illustrated in FIG. 3.

As illustrated in FIG. 3, the EVS 200 includes the pixel array unit 300 having a plurality of pixels 302 (see FIG. 4) arranged in a matrix. Each pixel 302 generates a voltage corresponding to a photocurrent generated by photoelectric conversion as a pixel signal. Furthermore, each pixel 302 detects the presence of an event by comparing a change of a photocurrent corresponding to a luminance change of incident light (emitted light from the object) with a predetermined threshold. In other words, each pixel 302 detects an event based on the luminance change exceeding the predetermined threshold.

As illustrated in FIG. 3, as a peripheral circuit unit of the pixel array unit 300, the EVS 200 also includes a drive circuit 211, an arbiter (arbitration unit) 213, a column processor 214, and a signal processor 212.

When detecting an event, each pixel 302 outputs a request to the arbiter 213 for output of event data indicating the generation of the event. When each pixel 302 receives a response from the arbiter 213 and is allowed to output the event data, each pixel 302 outputs the event data to the drive circuit 211 and the signal processor 212. Furthermore, a pixel 302 that has detected an event outputs a pixel signal generated by photoelectric conversion to the column processor 214.

The drive circuit 211 drives each pixel 302 of the pixel array unit 300. For example, the drive circuit 211 drives a pixel 302 which has detected an event and has output event data to output a pixel signal of the pixel 302 to the column processor 214.

The arbiter 213 arbitrates a request for output of event data supplied from each pixel 302 and transmits to each pixel 302 a response based on the arbitrated result (permission/non-permission for output of event data) and a reset signal for resetting event detection.

The column processor 214 converts an analog pixel signal output from a pixel 302 in each column of the pixel array unit 300 into a digital signal. The column processor 214 also performs correlated double sampling (CDS) with respect to the digitized pixel signal.

The signal processor 212 performs predetermined signal processing with respect to the digitized pixel signal supplied from the column processor 214 and the event data output from the pixel array unit 300, thereby outputting the event data (such as timestamp information) and the pixel signal subjected to the signal processing.

A change of a photocurrent generated in each pixel 302 is regarded as a change in quantity of light incident on each pixel 302 (luminance change). For this reason, an event is also referred to as a luminance change of a pixel 302 exceeding the predetermined threshold. In addition, event data representing the generation of the event includes at least position information such as coordinates indicating the position of the pixel 302 in which a change in quantity of light, or the event, is generated.

With reference to FIG. 4, the pixels 302 will be further described. In the pixel array unit 300 having the plurality of pixels 302 arranged in a matrix, each pixel 302 includes a light receiving unit 304, a pixel signal generator 306, and a detector (event detector) 308.

Specifically, the light receiving unit 304 photoelectrically converts incident light and generates a photocurrent. Under control of the drive circuit 211, the light receiving unit 304 supplies a voltage signal corresponding to the photocurrent to either the pixel signal generator 306 or the detector 308.

The pixel signal generator 306 generates a pixel signal based on the signal supplied from the light receiving unit 304. The pixel signal generator 306 supplies the generated analog pixel signal to the column processor 214 through a vertical signal line VSL (not illustrated) corresponding to a column of the pixel array unit 300.

The detector 308 detects the presence of an event based on whether a change of the photocurrent from the light receiving unit 304 exceeds the predetermined threshold. The event includes, for example, ON event indicating that the change of the photocurrent (luminance change) exceeds the upper limit of the threshold and OFF event indicating that the change of the photocurrent falls below the lower limit of the threshold. Note that the detector 308 may detect ON event only.

When an event is generated, the detector 308 outputs a request to the arbiter 213 for output of event data indicating the generation of the event. When the detector 308 receives a response to the request from the arbiter 213, the detector 308 outputs the event data to the drive circuit 211 and the signal processor 212.

2.3 Configuration of Control Unit 400

Figure 5:
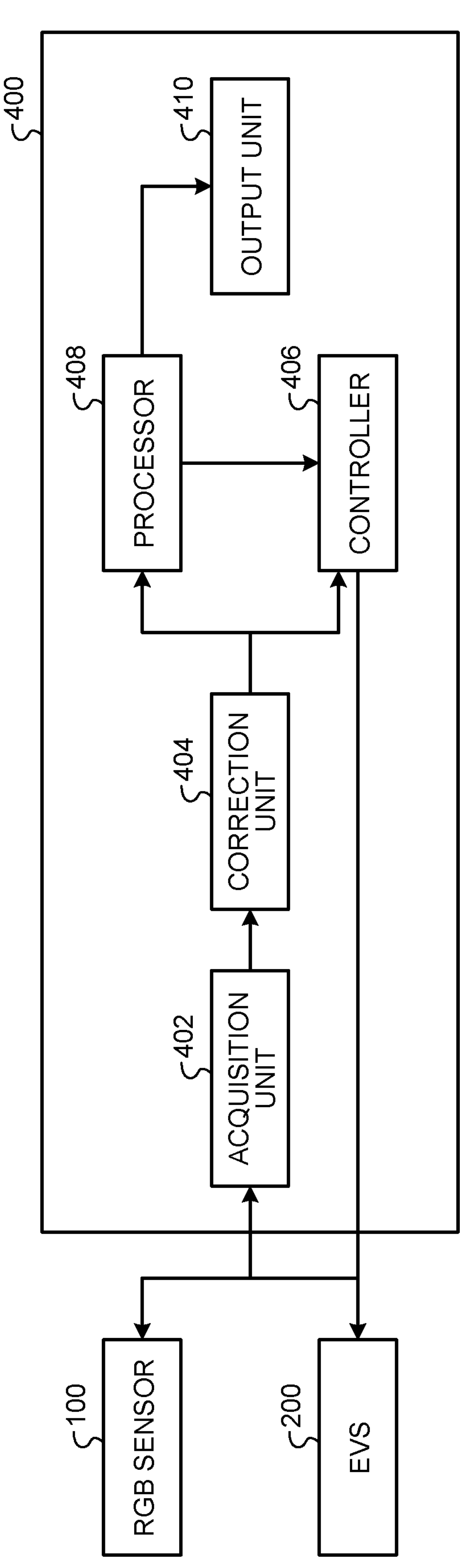
FIG. 5 is a block diagram illustrating an exemplary configuration of a control unit 400 according to the embodiment of this disclosure.

Next, with reference to FIG. 5, an exemplary configuration of the control unit 400 according to the embodiment of this disclosure will be described. FIG. 5 is a block diagram illustrating the exemplary configuration of the control unit 400 according to the embodiment of this disclosure. As illustrated in FIG. 5, the control unit 400 includes an acquisition unit 402, a correction unit 404, a controller 406, a processor 408, and an output unit 410 as main components. Hereinafter, details of the functional units in the control unit 400 will be described in sequence.

(Acquisition Unit 402)

The acquisition unit 402 acquires an image signal (first sensing data) from the RGB sensor 100 and an event data (second sensing data) from the EVS 200 and outputs to the signal and the data to the correction unit 404 (to be described).

(Correction Unit 404)

The correction unit 404 corrects a spatial difference (positional relation) and an optical difference between the RGB sensor 100 and the EVS 200. For example, based on a positional difference between the RGB sensor 100 and the EVS 200 (parallax and distances to a subject) and differences in angle of view and lens aberration between the RGB sensor 100 and the EVS 200, the correction unit 404 corrects a difference in position information (deviation) in the image signal and the event data output from the RGB sensor 100 and the EVS 200, respectively, so as to eliminate the difference in position information (deviation). Note that this embodiment is not limited in method of correction, and the correction may be performed based on data acquired in advance or may be performed using an image signal and event data of an existing subject (calibration tool) placed in a predetermined position.

Furthermore, in this embodiment, in order to synchronize times in timestamp information included in an image signal and event data, the correction unit 404 may incorporate a clock mechanism (not illustrated) for understanding the exact time and may correct a time gap between the RGB sensor 100 and the EVS 200.

(Controller 406)

The controller 406 controls the RGB sensor 100 and the EVS 200. Specifically, based on an image signal or event data output from one of the RGB sensor 100 and the EVS 200, the controller 406 controls the other sensor. In particular, the controller 406 may control ROI of the EVS 200 based on, for example, a range that includes a subject within an image generated from an image signal output from the RGB sensor. The controller 406 may also control a threshold (predetermined threshold) of the EVS 200 based on, for example, a luminance value of the subject or the ROI within the image. Furthermore, in order to select event data output from the EVS 200 to the processor 408 (to be described) based on a sampling rate and a sampling time (sampling rate and sampling time of the first sensing data) of the RGB sensor 100, the controller 406 may set a time of interest (TOI) in which such event data is to be included.

In addition, the controller 406 may control ROI of the RGB sensor 100 based on, for example, the event data output from the EVS 200. The controller 406 may also control the sampling rate, sampling time, and gain of the RGB sensor 100 or an illumination intensity of an illumination device (not illustrated) that irradiates the subject with light based on, for example, an output frequency of the event data. Still further, for example, based on the output frequency of the event data, the controller 406 may select an image signal output from the RGB sensor 100 to the processor 408 (to be described).

(Processor 408)

The processor 408 processes an image signal or event data output from one of the RGB sensor 100 and the EVS 200 and outputs the processed data (such as image and information) to the output unit 410 (to be described). Specifically, the processor 408 may estimate a condition of the subject or a condition of an image generated from the image signal based on, for example, a plurality of pieces of event data. Furthermore, the processor 408 may estimate motions of the subject based on, for example, the plurality of pieces of event data. In addition, the processor 408 may analyze, for example, the image generated from the image signal and estimate a condition of the subject.

(Output Unit 410)

The output unit 410 outputs an image and information to a display unit (not illustrated) in order to provide the image and the information to a user or outputs the image and the like to a learning device (not illustrated) for machine learning.

Note that the configuration of the control unit 400 illustrated in FIG. 5 is an example, and the configuration of the control unit 400 according to this embodiment is not limited to one illustrated in FIG. 5 and may include, for example, a storage unit (not illustrated) and a communication unit (not illustrated). Furthermore, the control unit 400 may be an information processing apparatus used in the following Examples.

In addition, the control unit 400 according to this embodiment may be applied to a system including a plurality of devices based on network connection (or communications between devices) as in cloud computing.

3. Examples According to Embodiment

The configuration examples of the information processing system 10 and the control unit 400 according to the embodiment of this disclosure have been described so far. Next, examples of information processing according to this embodiment will be described in more detail with reference to specific Examples. It should be noted that the following Examples are merely examples of the information processing according to this embodiment and the information processing according to this embodiment is not limited to the following examples.

3.1 Example 1

Figure 6:
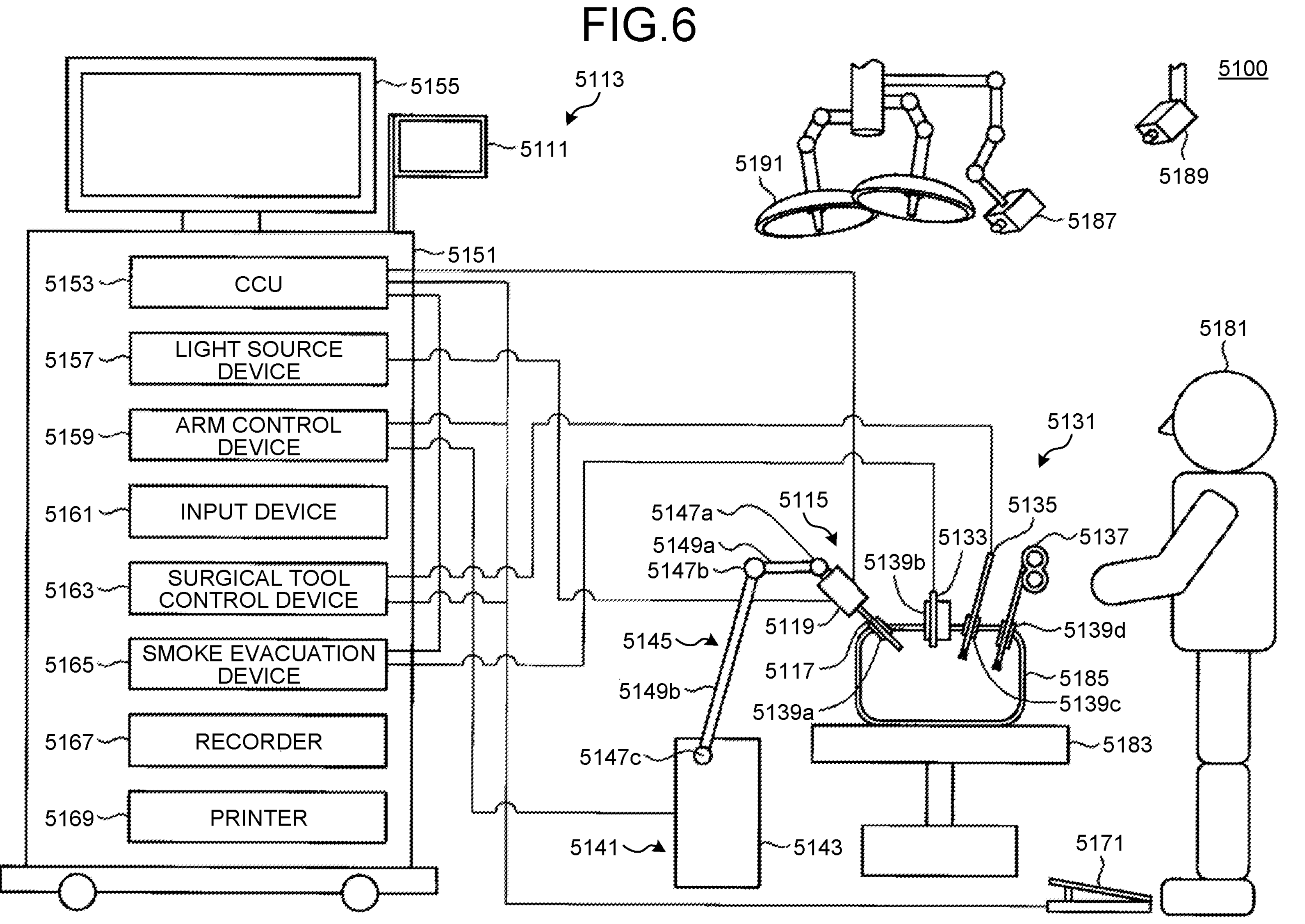
FIG. 6 is a view illustrating exemplary surgery to which an operating room system according to Example 1 is applied.

With reference to FIG. 6, hereinafter described is Example 1 in which the embodiment is applied to an operating room system 5100. FIG. 6 is a view illustrating exemplary surgery employing the operating room system 5100 according to Example 1. As illustrated in FIG. 6, a ceiling camera 5187 and an operative field camera 5189 are installed on the ceiling of an operating room and are capable of imaging the whole operating room and the hands of an operator (doctor) 5181 who treats an affected area of a patient 5185 lying on a patient bed 5183. The ceiling camera 5187 and the operative field camera 5189 may be provided with functions of adjusting magnifications, focal lengths, imaging directions, and the like. An illuminator 5191 is installed on the ceiling of the operating room and illuminates at least the hands of the operator 5181. The illuminator 5191 may be able to adjust a quantity and a wavelength (color) of irradiation light and an irradiation direction of the light appropriately.

An endoscopic surgery system 5113, the patient bed 5183, the ceiling camera 5187, the operative field camera 5189, and the illuminator 5191 are connected interactively through an audiovisual controller and an operating room control device (not illustrated). The operating room is provided with a centralized control panel 5111. Through the centralized control panel 5111, a user appropriately operates these devices inside the operating room.

Hereinafter, a configuration of the endoscopic surgery system 5113 will be described in detail. As illustrated in the drawing, the endoscopic surgery system 5113 is provided with an endoscope 5115, other surgical instruments 5131, a supporting arm device 5141 that supports the endoscope 5115, and a cart 5151 loaded with various devices for endoscopic surgery.

In endoscopic surgery, instead of laparotomy in which the abdominal wall is cut and opened, a plurality of cylindrical puncture instruments called trocars 5139*a* to 5139*d* is inserted into the abdominal wall. From the trocars 5139*a* to 5139*d*, a lens barrel 5117 of the endoscope 5115 and the surgical instruments 5131 are inserted into a body cavity of the patient 5185. In the illustrated example, as the surgical instruments 5131, a tube 5133, an energy-based surgical tool 5135, and forceps 5137 are inserted into the body cavity of the patient 5185. Herein, the tube 5133 may be configured to evacuate smoke generated inside the body cavity from the body cavity. Furthermore, the tube 5133 may have a function of injecting gas into the body cavity to inflate the body cavity. The energy-based surgical tool 5135 is used for incision and abrasion of a tissue or sealing of a blood vessel by a high-frequency current or ultrasonic vibration. Note that the illustrated surgical instruments 5131 are examples, and various surgical instruments such as tweezers and a retractor used in typical endoscopic surgery may be employed as the surgical instruments 5131.

A surgical site within the body cavity of the patient 5185 imaged by the endoscope 5115 is shown on a display device 5155. While viewing the image of the surgical site shown on the display device 5155, the operator 5181 uses the energy-based surgical tool 5135 and the forceps 5137 to perform treatment such as resection of the affected area. Although it is not illustrated, the tube 5133, the energy-based surgical tool 5135, and the forceps 5137 are supported by the operator 5181 or an assistant during surgery.

(Supporting Arm Device)

The supporting arm device 5141 includes an arm 5145 that stretches from a base 5143. In the illustrated example, the arm 5145 includes joints 5147*a*, 5147*b*, and 5147*c* and links 5149*a* and 5149*b* and is driven by the control from an arm control device 5159. The arm 5145 supports the endoscope 5115 and controls the position and posture of the endoscope 5115. Accordingly, it is possible to fix the position of the endoscope 5115 stably.

(Endoscope)

The endoscope 5115 includes the lens barrel 5117 having a predetermined length from a distal end which is inserted into the body cavity of the patient 5185 and a camera head 5119 connected to a proximal end of the lens barrel 5117. In the illustrated example, the endoscope 5115 is illustrated as a rigid endoscope that includes the lens barrel 5117 having rigidity, but the endoscope 5115 may also be a flexible endoscope that includes the lens barrel 5117 having flexibility.

The lens barrel 5117 has the distal end provided with an opening into which an objective lens is fitted. To the endoscope 5115, a light source device 5157 is connected, and light generated by the light source device 5157 is guided to the distal end of the lens barrel by a light guide extending inside the lens barrel 5117, and the light illuminates an object of observation inside the body cavity of the patient 5185 through the objective lens. Note that the endoscope 5115 may be a forward-viewing, oblique-viewing, or lateral-viewing endoscope.

The inside of the camera head 5119 is provided with an optical system and an image pickup element, and reflected light (observation light) from the object of observation is concentrated on the image pickup element by the optical system. The image pickup element photoelectrically converts the observation light, thereby generating an electric signal corresponding to the observation light, that is, an image signal or event data corresponding to an observation image. In other words, the inside of the camera head 5119 is provided with the RGB sensor 100 and the EVS 200. The image signal and the event data are transmitted to a camera control unit (CCU) 5153 as RAW data. Note that appropriately driving the optical system provides the camera head 5119 with a function of adjusting a magnification and a focal length.

For example, the camera head 5119 may be provided with a plurality of image pickup elements to be compatible with stereoscopic display (3D display) or the like. In this case, the inside of the lens barrel 5117 is provided with a plurality of relay optical systems in order to guide the observation light to the plurality of image pickup elements, respectively.

(Various Devices Loaded on Cart)

The CCU 5153 includes, for example, a central processing unit (CPU) and a graphics processing unit (GPU) and controls operation of the endoscope 5115 and the display device 5155 overall. In other words, the CCU 5153 functions as the control unit 400. Specifically, the CCU 5153 performs various types of image processing on an image signal and event data received from the camera head 5119 such as development (de-mosaicing) in order to display an image based on the image signal. The CCU 5153 provides the image signal subjected to the image processing to the display device 5155. To the CCU 5153, the aforementioned audiovisual controller is connected. The CCU 5153 also provides the image signal subjected to the image processing to an audiovisual controller 5107. Furthermore, the CCU 5153 transmits a control signal to the camera head 5119 and controls the drive of the camera head 5119. The control signal may include information associated with image pickup requirements such as magnification and focal length. The information associated with the image pickup requirements may be input through an input device 5161 or through the centralized control panel 5111.

Being controlled by the CCU 5153, the display device 5155 shows an image based on the image signal subjected to the image processing by the CCU 5153. In a case where the endoscope 5115 is compatible with, for example, imaging at a resolution as high as 4K (3840 horizontal pixels×2160 vertical pixels) or 8K (7680 horizontal pixels×4320 vertical pixels) and/or compatible with 3D display, a device that enables high-resolution display and/or 3D display is used as the display device 5155. In a case where the endoscope 5115 is compatible with imaging at a resolution as high as 4K or 8K, using a device having a size of 55 inches or more as the display device 5155 offers a more immersive feeling. Depending on the intended use, a plurality of display devices 5155 having different resolutions and sizes may be employed.

The light source device 5157 includes a light source such as light emitting diode (LED) and supplies the endoscope 5115 with irradiation light for imaging of a surgical site.

The arm control device 5159 includes a processor such as CPU and operates according to a predetermined program, thereby controlling the drive of the arm 5145 of the supporting arm device 5141 by a predetermined control method.

The input device 5161 is an input interface for the endoscopic surgery system 5113. Through the input device 5161, a user inputs various types of information and instructions into the endoscopic surgery system 5113. For example, through the input device 5161, a user inputs various types of information associated with surgery such as physical information of a patient and operative procedure information of the surgery. Furthermore, for example, through the input device 5161, a user inputs an instruction to drive the arm 5145, an instruction to cause the endoscope 5115 to change image pickup requirements (such as type of irradiation light, magnification, and focal length), and an instruction to drive the energy-based surgical tool 5135.

The input device 5161 is not limited in type and may be a known input device of any type. Applicable examples of the input device 5161 include a mouse, a keyboard, a touch panel, a switch, a foot switch 5171, and/or a lever. In a case where a touch panel is employed as the input device 5161, the touch panel may be disposed on a display surface of the display device 5155.

Alternatively, the input device 5161 is a device worn by a user such as glasses-type wearable device and head mounted display (HMD), and various types of information are input according to user's gestures and line of sight detected by the device. The input device 5161 also includes a camera capable of detecting motions of a user, and various types of information are input according to user's gestures and line of sight detected from a video captured by the camera. In addition, the input device 5161 includes a microphone capable of collecting a user's voice, and various types of information are input by the voice through the microphone. In this manner, the input device 5161 is configured to enable non-contact input of various types of information, which makes it possible for a user particular in a clean area (for example, the operator 5181) to operate unclean equipment without touching the equipment. Furthermore, the input device 5161 enables the user to operate the equipment without releasing his/her hand from surgical instruments, thereby enhancing the user friendliness.

A surgical tool control device 5163 controls the drive of the energy-based surgical tool 5135 used for, for example, cauterization and incision of a tissue and sealing of a blood vessel. For the purpose of securing a field of view of the endoscope 5115 and a working space for an operator, a smoke evacuation device 5165 feeds gas into the body cavity of the patient 5185 through the tube 5133 to inflate the body cavity. In order to secure a field of view of the endoscope 5115, the smoke evacuation device 5165 also has a function of evacuating smoke generated in the body cavity. A recorder 5167 is a device capable of recording various types of information associated with surgery. A printer 5169 is a device capable of printing the various types of information associated with the surgery in various formats such as text, image, and graph.

Hereinafter, unique configurations of the endoscopic surgery system 5113 will be described in more detail.

(Supporting Arm Device)

The supporting arm device 5141 includes the base 5143 as a pedestal and the arm 5145 stretching from the base 5143. In the illustrated example, the arm 5145 includes a plurality of joints **5147*a*, 5147*b*, and 5147*c* and a plurality of links 5149*a* and 5149*b* coupled to each other by the joint 5147*b*, but in FIG. 6, the arm 5145 is roughly illustrated for simplicity. In practice, shapes, the number, and arrangements of the joints 5147*a* to 5147*c* and the links 5149*a* and 5149*b* and directions of rotation axes or the like of the joints 5147*a* to 5147*c* are set appropriately to provide the arm 5145 with a desired degree of freedom. For example, the arm 5145 may preferably have six or more degrees of freedom. Accordingly, the endoscope 5115 can be freely moved within the movable range of the arm 5145, whereby the lens barrel 5117 of the endoscope 5115 is inserted into the body cavity of the patient 5185** from a desired direction.

The joints **5147*a* to 5147*c* are provided with an actuator, and the joints 5147*a* to 5147*c* are driven by the actuator to rotate about predetermined rotation axes. The drive of the actuator is controlled by the arm control device 5159, whereby the rotation angle of each of the joints 5147*a* to 5147*c* is controlled and the drive of the arm 5145 is controlled. Accordingly, it is possible to control the position and posture of the endoscope 5115. At this time, the arm control device 5159 can control the drive of the arm 5145** by various known control methods such as force control and position control.

For example, the position and posture of the endoscope 5115 may be controlled by the operator 5181 appropriately inputting an operation through the input device 5161 (including the foot switch 5171) and causing the arm control device 5159 to appropriately control the drive of the arm 5145 according to the input operation. After moving the endoscope 5115 at the distal end of the arm 5145 from one position to another by the aforementioned control, the position of the endoscope 5115 is fixed and supported. Note that the arm 5145 may be operated in what is called master-slave mode. In this case, the arm 5145 is remotely controlled by a user through the input device 5161 installed in a place away from the operating room.

In a case where force control is applied, the arm control device 5159 may perform what is called power assist control in which the arm control device 5159 receives an external force from a user and drives the actuator of the joints 5147*a* to 5147*c* to move the arm 5145 according to the external force. Accordingly, when the user moves the arm 5145 by directly touching the arm 5145, it is possible to move the arm 5145 with a relatively light force. Therefore, it is possible to move the endoscope 5115 more intuitively and with a simpler operation, thereby enhancing the user friendliness.

In typical endoscopic surgery, the endoscope 5115 is supported by a doctor called scopist. In contrast, using the supporting arm device 5141 makes it possible to firmly fix the position of the endoscope 5115 without relying on manual efforts, which offers a stable surgical site image and smooth surgery.

It should be noted that the arm control device 5159 is not necessarily loaded on the cart 5151. Furthermore, the arm control device 5159 is not necessarily one device. For example, the arm control device 5159 may be disposed on each of the joints 5147*a* to 5147*c* of the arm 5145 in the supporting arm device 5141, and a plurality of arm control devices 5159 may cooperate with each other to control the drive of the arm 5145.

(Light Source Device)

The light source device 5157 supplies irradiation light to the endoscope 5115 for imaging of a surgical site. The light source device 5157 includes, for example, an LED, a laser light source, or a white light source including both an LED and a laser light source. In a case where a white light source includes a combination of RGB laser light sources, it is possible to control an output intensity and output timing of each color (each wavelength) with high accuracy, thereby adjusting white balance of a captured image in the light source device 5157. Furthermore, in this case, an object of observation is irradiated with laser beams from each of the RGB laser light sources by time-sharing irradiation, and the drive of the image pickup element of the camera head 5119 is controlled in synchronization with the irradiation timing, which makes it possible to capture an image corresponding to RGB by time-sharing. According to this method, it is possible to obtain a color image without providing a color filter to the image pickup element.

Alternatively, the drive of the light source device 5157 may be controlled so that the intensity of light to be output varies per predetermined time. The drive of the image pickup element of the camera head 5119 is controlled by time-sharing in synchronization with the timing of changing the light intensity so as to acquire an image and to synthesize the image, which makes it possible to generate a high dynamic range image without what is called blocked-up shadows and blown-out highlights.

Alternatively, the light source device 5157 may have a configuration that supplies light having a predetermined wavelength band compatible with special light observation. In the special light observation, for example, what is called narrow band imaging is performed in which a predetermined tissue such as a blood vessel in a mucosal surface is imaged by irradiating the tissue with light having a narrower band than irradiation light (that is, white light) typically used in observation, utilizing wavelength dependence of light absorption in the body tissue. Alternatively, the special light observation may employ fluorescence imaging in which an image is obtained by fluorescence light generated by emitting excitation light. In the fluorescence observation, a body tissue is irradiated with excitation light to observe fluorescence light from the body tissue (autofluorescence imaging) or a reagent such as indocyanine green (ICG) is locally injected into a body tissue and the body tissue is irradiated with excitation light corresponding to a fluorescent wavelength of the reagent the body tissue so as to obtain a fluorescent image. The light source device 5157 is configured to supply narrow-band light and/or excitation light compatible with such special light observation.

(Camera Head and CCU)

Figure 7:
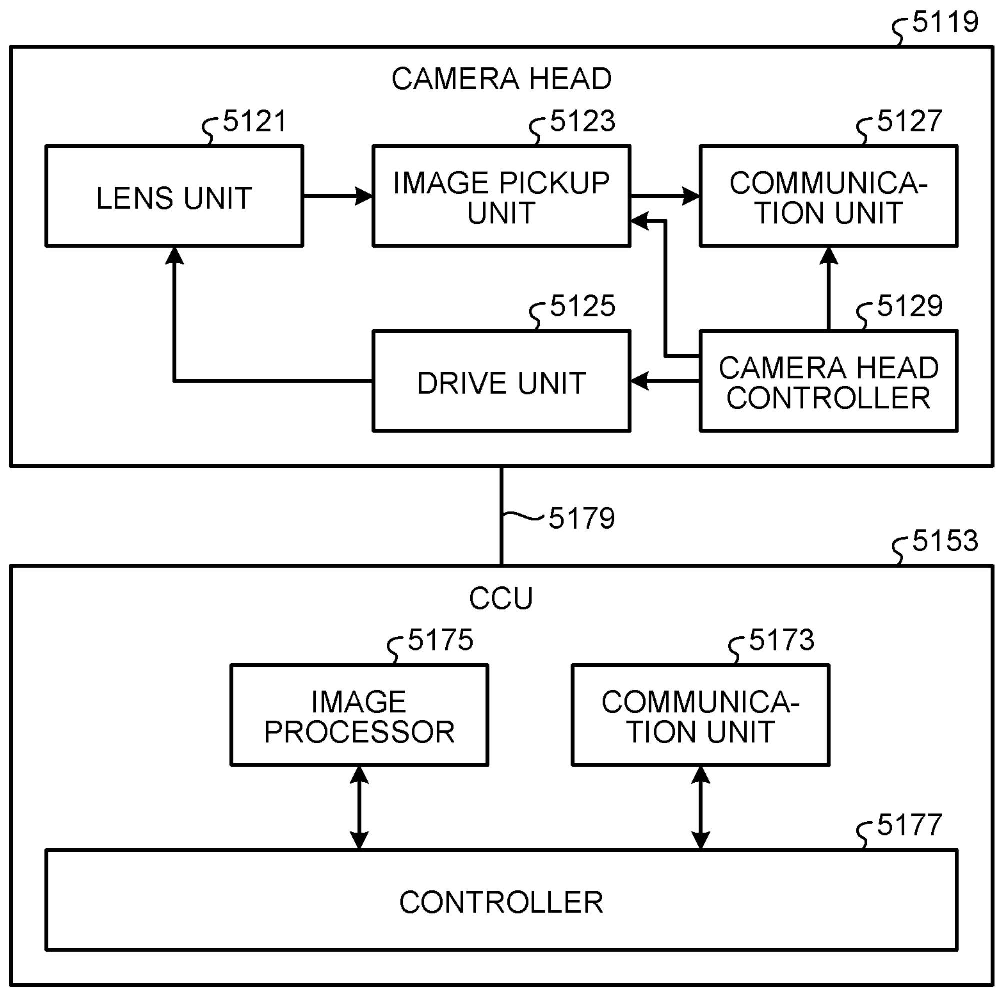
FIG. 7 is a block diagram illustrating exemplary functional configurations of a camera head and a CCU illustrated in FIG. 6.

Next, with reference to FIG. 7, functions of the camera head 5119 and the CCU 5153 of the endoscope 5115 will be described in more detail. FIG. 7 is a block diagram illustrating exemplary functional configurations of the camera head 5119 and the CCU 5153 illustrated in FIG. 6.

Referring to FIG. 7, the camera head 5119 includes as a lens unit 5121, an image pickup unit 5123, a drive unit 5125, a communication unit 5127, and a camera head controller 5129 as functional units. The CCU 5153 includes a communication unit 5173, an image processor 5175, and a controller 5177 as functional units. The camera head 5119 and the CCU 5153 are bidirectionally communicable, being connected to each other by a transmission cable 5179.

First, the functional configuration of the camera head 5119 will be described. The lens unit 5121 is an optical system disposed in a connection between the lens barrel 5117 and the camera head 5119. Observation light taken in from the distal end of the lens barrel 5117 is guided to the camera head 5119 and enters the lens unit 5121. In the lens unit 5121, a plurality of lens including a zoom lens and a focus lens is combined. The lens unit 5121 has optical characteristics adjusted so as to enable collection of the observation light on a light receiving surface of an image pickup element of the image pickup unit 5123. In addition, the zoom lens and focus lens are movable along an optical axis in order to adjust a magnification and a focal point of the captured image.

The image pickup unit 5123 includes the image pickup element and is disposed behind the lens unit 5121. The observation light passed through the lens unit 5121 is concentrated on the light receiving surface of the image pickup element, and an image signal or event data corresponding to an observation image is generated by photoelectric conversion. The image signal or event data generated by the image pickup unit 5123 is provided to the communication unit 5127.

An example of the image pickup element included in the image pickup unit 5123 is an image sensor of complementary metal oxide semiconductor (CMOS) type (for example, the RGB sensor 100) that has a Bayer array and is capable of color photography. Note that the image pickup element may employ, for example, an element compatible with imaging at a resolution as high as 4K or more. Obtaining a surgical site image with high resolution, the operator 5181 can understand the condition of the surgical site in more detail and can proceed the surgery more smoothly.

Another example of the image pickup element included in the image pickup unit 5123 is the EVS 200, or an element that detects a luminance change and outputs event data. The event data includes a time at which the luminance change is detected, coordinates of a pixel 302 where the luminance change is detected, and information on an increase and decrease of the luminance change.

Furthermore, the image pickup element included in the image pickup unit 5123 may include a pair of image pickup elements for acquiring image signals for the right eye and the left eye, being compatible with 3D display. With 3D display, the operator 5181 can accurately understand a depth of a body tissue in the surgical site. In a case where the image pickup unit 5123 is of a multi-plate type, the lens unit 5121 is disposed for each image pickup element.

The image pickup unit 5123 is not necessarily disposed on the camera head 5119. For example, the image pickup unit 5123 may be disposed inside the lens barrel 5117, right behind the objective lens.

The drive unit 5125 includes an actuator and causes the zoom lens and focus lens of the lens unit 5121 to move predetermined distances along the optical axis by being controlled by the camera head controller 5129. Accordingly, the image pickup unit 5123 can appropriately adjust a magnification and a focal point of a captured image.

The communication unit 5127 includes a communication device for transmitting and receiving various types of information between the CCU 5153. The communication unit 5127 transmits the image signal obtained from the image pickup unit 5123 as RAW data to the CCU 5153 over the transmission cable 5179. At this time, it is preferable to transmit the image signal by optical communications in order to display the captured image of the surgical site with low latency. During surgery, the operator 5181 performs an operation while observing the condition of the affected area by the captured image, and it is required to display surgical site video in real time as much as possible for the sake of safe and reliable surgery. In employing optical communications, the communication unit 5127 is provided with a photoelectric conversion module that converts an electric signal into an optical signal. After the image signal is converted into an optical signal by the photoelectric conversion module, the signal is transmitted to the CCU 5153 over the transmission cable 5179.

Furthermore, the communication unit 5127 receives from the CCU 5153 a control signal for controlling the drive of the camera head 5119. The control signal includes information associated with the image pickup requirements such as information used for designating a sampling rate and a sampling time of the captured image (RGB image generated from the image signal), information used for designating an exposure value at the time of capturing the image, and/or information used for designating a magnification and a focal point of the captured image. The communication unit 5127 provides the received control signal to the camera head controller 5129. Note that the control signal from the CCU 5153 may also be transmitted by optical communications. In this case, the communication unit 5127 is provided with a photoelectric conversion module that converts an optical signal into an electric signal. After the control signal is converted into an electric signal by the photoelectric conversion module, the control signal is provided to the camera head controller 5129.

Note that image pickup requirements such as sampling rate, exposure value, magnification, and focal point are set automatically by the controller 5177 of the CCU 5153 based on the acquired image signal. In other words, the endoscope 5115 is provided with what is called auto exposure (AE), auto focus (AF), and auto white balance (AWB) functions.

The camera head controller 5129 controls the drive of the camera head 5119 based on the control signal from the CCU 5153 received through the communication unit 5127. For example, the camera head controller 5129 controls the drive of the image pickup element of the image pickup unit 5123 based on information for specifying a sampling rate and sampling time of the captured image and/or information for specifying exposure during image capturing. Furthermore, for example, the camera head controller 5129 causes the zoom lens and focus lens of the lens unit 5121 to move through the drive unit 5125 based on the information for specifying a magnification and a focal point of the captured image. The camera head controller 5129 may also have a function of storing information for identifying the lens barrel 5117 and the camera head 5119.

Note that placing the lens unit 5121 and the image pickup unit 5123 in a sealed structure with high airtightness and waterproofness provides the camera head 5119 with a resistance to autoclave sterilization.

Next, the functional configuration of the CCU 5153 will be described. The communication unit 5173 includes a communication device for transmitting and receiving various types of information to and from the camera head 5119. The communication unit 5173 receives the image signal and/or event data transmitted from the camera head 5119 over the transmission cable 5179. At this time, as described above, the image signal is preferably transmitted by optical communications. In this case, the communication unit 5173 is provided with a photoelectric conversion module that converts an optical signal into an electric signal, being compatible with optical communications. The communication unit 5173 provides the image signal converted into an electric signal and/or event data to the image processor 5175.

In addition, the communication unit 5173 transmits a control signal for controlling the drive of the camera head 5119 to the camera head 5119. The control signal may also be transmitted by optical communications.

The image processor 5175 performs various types of image processing on the image signal and event data, or RAW data, transmitted from the camera head 5119. In other words, the image processor 5175 functions as the processor 408 of the control unit 400. The image processing includes various types of known signal processing such as development, picture quality enhancement (for example, band enhancement, super-resolution, noise reduction (NR) and/or camera shake reduction) and/or enlargement (electronic zooming). The image processor 5175 also performs detection processing on the image signal for AE, AF, and AWB.

The image processor 5175 includes a processor such as CPU and GPU, and the processor operates according to a predetermined program so as to perform the image processing and detection processing. In a case where the image processor 5175 includes a plurality of GPUs, the image processor 5175 appropriately divides information associated with the image signal, and the plurality of GPUs performs parallel image processing.

The controller 5177 controls various types of control associated with image capturing of the surgical site by the endoscope 5115 and the display of the captured image. In other words, the controller 5177 functions as the controller 406 of the control unit 400. For example, the controller 5177 generates a control signal for controlling the drive of the camera head 5119. At this time, in a case where the image pickup requirements are input by a user, the controller 5177 generates a control signal based on the input from the user. Alternatively, in a case where the endoscope 5115 is provided with AE, AF, and AWB functions, the controller 5177 appropriately calculates an optimum exposure value, focal length, and white balance based on the result of the detection processing by the image processor 5175, thereby generating a control signal.

Furthermore, the controller 5177 causes the display device 5155 to show a surgical site image (RGB image) based on the image signal subjected to the image processing by the image processor 5175. At this time, the controller 5177 uses various image recognition technologies to recognize various objects in the surgical site image. For example, the controller 5177 detects shapes, colors, and the like of edges of the objects included in the surgical site image to recognize surgical instruments such as forceps, a specific site of the living body, bleed, and mist or the like generated when the energy-based surgical tool 5135 is used. When the controller 5177 causes the display device 5155 to show the surgical site image, the controller 5177 uses the recognized results and superimposes various pieces of surgical support information on the surgical site image. Presenting the superimposed surgical support information to the operator 5181 enables the operator 5181 to proceed surgery more safely and reliably.

The transmission cable 5179 that connects the camera head 5119 and the CCU 5153 is an electric signal cable compatible with communications of electric signals, an optical fiber compatible with optical communications, or a composite cable thereof.

The illustrated example employs wired communications by the transmission cable 5179, but the communications between the camera head 5119 and the CCU 5153 may be wireless. In a case where the camera head 5119 and the CCU 5153 are communicated wirelessly, there is no need to lay the transmission cable 5179 in the operating room, thereby eliminating a problem of the transmission cable 5179 blocking the passage of medical staffs in the operating room.

An example of the operating room system 5100 to which the embodiment of this disclosure is applied has been described so far. Herein, a medical system to which the operating room system 5100 is applied is illustrated as the endoscopic surgery system 5113, but the operating room system 5100 is not limited to this configuration. For example, the operating room system 5100 may be applied to a flexible endoscope system for examination and a microscopic surgery system instead of the endoscopic surgery system 5113.

(Medical Image Generation System 1)

Figure 8:
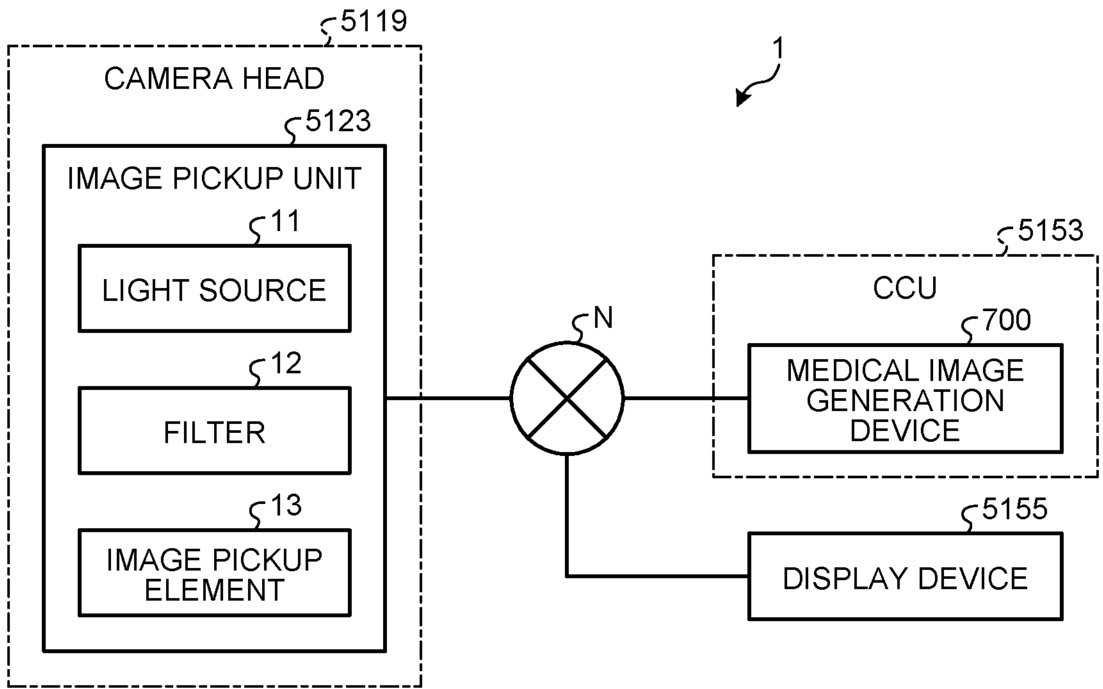
FIG. 8 is a view illustrating a medical image generation system 1 according to Example 1.

Next, with reference to FIG. 8, a medical image generation system 1 according to Example 1 will be described. FIG. 8 is a view of the medical image generation system 1 according to Example 1. As illustrated in FIG. 8, the medical image generation system 1 includes the camera head 5119, the display device 5155, and a medical image generation device 700.

The camera head 5119 provides a captured medical image to the medical image generation device 700. Other details of the camera head 5119 are similar to the camera head 5119 illustrated in FIG. 6.

The image pickup unit 5123 is a camera head-type camera and used to capture an image inside the body, for example, in a hospital or a laboratory. The image pickup unit 5123 uses near infrared rays to develop a dye such as ICG flowing in a blood vessel. The image pickup unit 5123 acquires a medical image by capturing a developed fluorescent color. As illustrated in FIG. 8, the image pickup unit 5123 includes a light source 11, a filter 12, an image pickup element 13.

The light source 11 emits light for developing a fluorescent dye such as ICG. The light source 11 emits, for example, near infrared rays.

The filter 12 transmits only fluorescent light of a specific wavelength. For example, the filter 12 transmits longer wavelengths and blocks shorter wavelengths. The filter 12 is used to transmit only the fluorescent light of the specific wavelength among fluorescent light emitted by the light source 11. Since fluorescent light of longer wavelengths scatters less as optical characteristics, a technique for capturing an image by transmitting only fluorescent light of longer wavelengths among fluorescent light of all wavelengths is conceivable. However, capturing a medical image using only fluorescent light of longer wavelengths causes a decreased fluorescent intensity, which may deteriorate image quality. In addition, the medical image becomes dark. Therefore, the image capturing technique using only fluorescent light of longer wavelengths leaves room for improvement in promoting visibility.

The image pickup element 13 is an image pickup device that captures an image of an object of observation in the body and acquires a medical image (for example, pathological image) and event data. In other words, the image pickup element 13 can function as the RGB sensor 100 and the EVS 200. Note that the object of observation is, for example, a blood vessel, a tissue, and a cell. The image pickup element 13 is used for capturing an image with the fluorescent light of the specific wavelength transmitted through the filter 12. Furthermore, the image pickup element 13 sends the acquired medical image and event data to the medical image generation device 700.

The display device 5155 receives the image output from the medical image generation device 700 and shows the received output image. Other details of the display device 5155 is similar to the details of the display device 5155 illustrated in FIG. 6.

The medical image generation device 700 is an information processing apparatus such as PC and work station (WS). The medical image generation device 700 acquires the medical image captured by the image pickup unit 5123 and the event data. Specifically, the medical image generation device 700 causes the image pickup element 13 to acquire a medical image captured with fluorescent light of different wavelengths. Next, the medical image generation device 700 generates an output image based on a degree of diffusion in the medical image captured with the fluorescent light of different wavelengths. Furthermore, the medical image generation device 700 transmits the output image to the display device 5155. The medical image generation device 700 may be, for example, the CCU 5153 as described in FIG. 6.

(Procedure)

Figure 9:
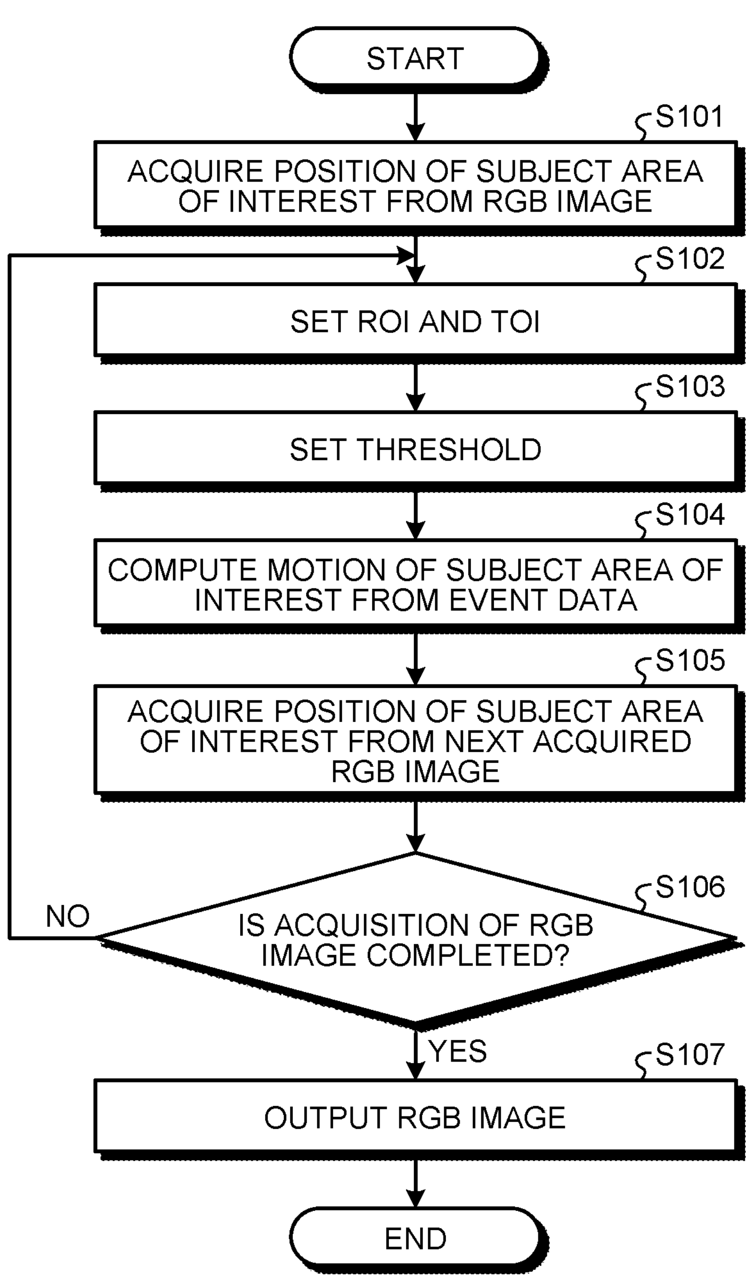
FIG. 9 is a flowchart illustrating a procedure according to Example 1.
Figure 10:
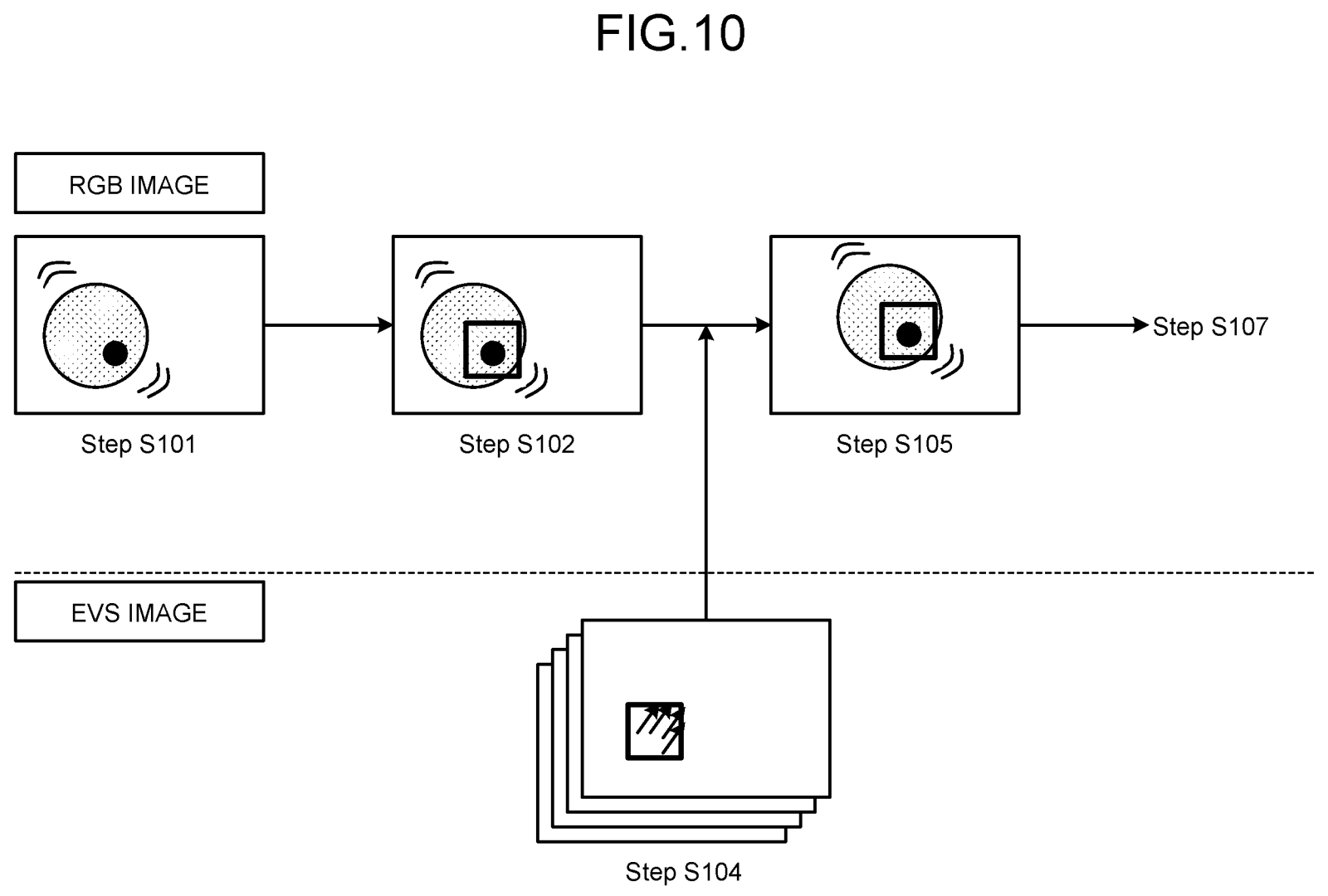
Figure 11:
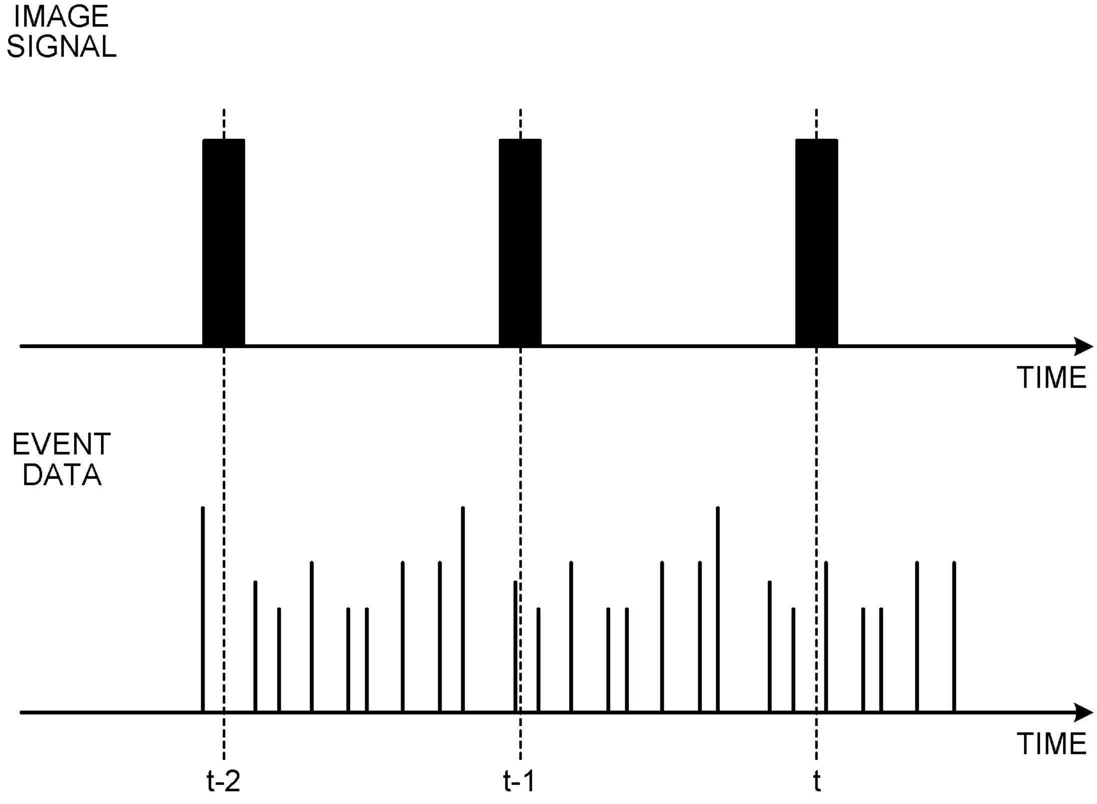
FIG. 11 is a view for describing Example 1 (part 2).

With reference to FIGS. 9 to 11, hereinafter described is a method for tracking (following) a moving subject area of interest based on an image signal (RGB image) and event data obtained by the image pickup unit 5123 (the RGB sensor 100 and the EVS 200). FIG. 9 is a flowchart illustrating a procedure according to Example 1. FIG. 10 and FIG. 11 are views for describing Example 1. Specifically, FIG. 10 illustrates an RGB image and an EVS image captured in this Example, and FIG. 11 illustrates a temporal correlation between an image signal from the RGB sensor 100 and event data from the EVS 200.

In resection of a subject area of interest (for example, a tumor) in a surgical operation, it is required to recognize the position of the subject area of interest at high speed and with high accuracy in order not to damage other organs and tissues. However, the RGB sensor 100 typically has a sampling rate of 30 to 60 times/second. In a case where the subject area of interest moves at high speed, there is a limit on accurate motion estimation of the subject area of interest using an image from the RGB sensor. In other words, it is difficult for the RGB sensor 100 to track such a subject area of interest at high speed and with high accuracy.

A conceivable solution to this problem is to increase the sampling rate, but an increase in weight of the system, an increase in volume to be processed, and an increase in power consumption are inevitable. As another conceivable solution, an image acquired in advance is used to predict motions of the subject area of interest, whereby a range in the next image to be acquired is limited to a necessary narrow range (ROI is set). However, in a case where the subject area of interest moves at high speed, it is difficult to set ROI preferably since there is a limit on enhancement in motion prediction accuracy. Alternatively, ROI may be set wide in order to capture the subject area of interest without fail during the tracking, but setting wide ROI increases the processing time.

Therefore, in this Example 1, event data from the EVS 200 is used to track a moving subject area of interest at high speed and with high accuracy, thereby preferably limiting ROI in the next reference image to a necessary range. An example of the procedure according to Example 1 will now be described.

As illustrated in FIG. 9, the procedure of this Example involves a plurality of steps from Step S101 to Step S107. Hereinafter, details of the steps will be described in sequence.

The CCU 5153 (control unit 400) generates an RGB image from an image signal acquired at a time t−1 illustrated in FIG. 11 (indicated by a black rectangle in the upper part of FIG. 11) and specifies the position of a subject area of interest (for example, a tumor) (object) from the generated RGB image as illustrated in the upper left of FIG. 10. In this Example, the subject area of interest (tumor) may be identified by image recognition using a model obtained by machine learning or may be set by direct input from a user (Step S101).

Next, the CCU 5153 sets a region including the subject area of interest (tumor) in the RGB image as illustrated in the upper middle part of FIG. 10 as ROI of the EVS 200 (a range surrounded by a thick frame in FIG. 10). Furthermore, based on a sampling rate and sampling time of the RGB sensor 100, the CCU 5153 sets a period from the time t−1 to a time t at which the RGB sensor 100 acquires the next image signal as TOI of the EVS 200 (Step S102). Note that event data acquired in the TOI is selected as event data used in Step S104 (to be described).

Next, based on a luminance value of the subject area of interest or the ROI within the RGB image, the CCU 5153 sets a threshold (predetermined threshold) used for a comparison with a change in luminance value in the EVS 200 (Step S103).

In addition, the CCU 5153 acquires event data within the ROI and TOI set in Step S102 (event data obtained during the period from the time t−1 to the time t illustrated in the lower part of FIG. 11). Next, the CCU 5153 computes a motion of the subject area of interest from the acquired event data as illustrated in the lower part of FIG. 10 (Step S104).

Next, the CCU 5153 generates an RGB image from an image signal obtained at the time t illustrated in FIG. 11 (indicated by a black rectangle in FIG. 11). As illustrated in the upper right of FIG. 10, based on the motion obtained in Step S104, the CCU 5153 specifies the position of the subject area of interest within the RGB image (Step S105). The CCU 5153 may also set new ROI based on the specified position of the subject area of interest. In this manner, setting ROI in the next RGB image to be acquired makes it possible to limit a range for pixel recognition, thereby reducing a data volume to be processed and enhancing the recognition accuracy.

Next, the CCU 5153 determines whether image acquisition based on the image signal obtained until the time set by the user is completed (Step S106). When the CCU 5153 determines that the acquisition is completed (Step S106: Yes), the process moves on to Step S107, and when the CCU 5153 determines that the acquisition is not completed (Step S106: No), the process returns to Step S102. In other words, in this Example, in order to continuously track (follow) the subject area of interest, the processing is executed repeatedly from Step S102 to Step S105.

The CCU 5153 outputs an image (RGB image) obtained by the last acquired image signal and position information of the subject of interest to the display device 5155 (Step S107), thereby ending the processing.

As described above, in this Example 1, it is possible to observe a moving subject area of interest in real time by high-speed and high-accuracy tracking of the subject area of interest based on event data from the EVS 200.

Furthermore, in this Example, since ROI and TOI are initially set for the EVS 200, it is possible to promote reduction in data volume, which enables high-speed computation of motions. Therefore, according to this Example, it is possible to avoid an increase in weight of the system, an increase in data volume, an increase in processing time, and an increase in power consumption. Still further, in this Example, since a threshold of the EVS 200 is set according to a luminance value of a subject area of interest or ROI, it is possible to obtain event data having an excellent S/N ratio.

3.2 Example 2

Hereinafter described is Example 2 in which this embodiment is applied to a diagnosis of continuous motions captured in a plurality of images and to machine learning in order to enhance qualities of images. In this Example 2, motion blur generated in images are predicted, and an image with little motion blur or without motion blur is presented for the diagnosis and machine learning, thereby enhancing accuracy of the diagnosis and machine learning. Now, Example 2 will be described with reference to FIGS. 12 to 14.

Figure 12:
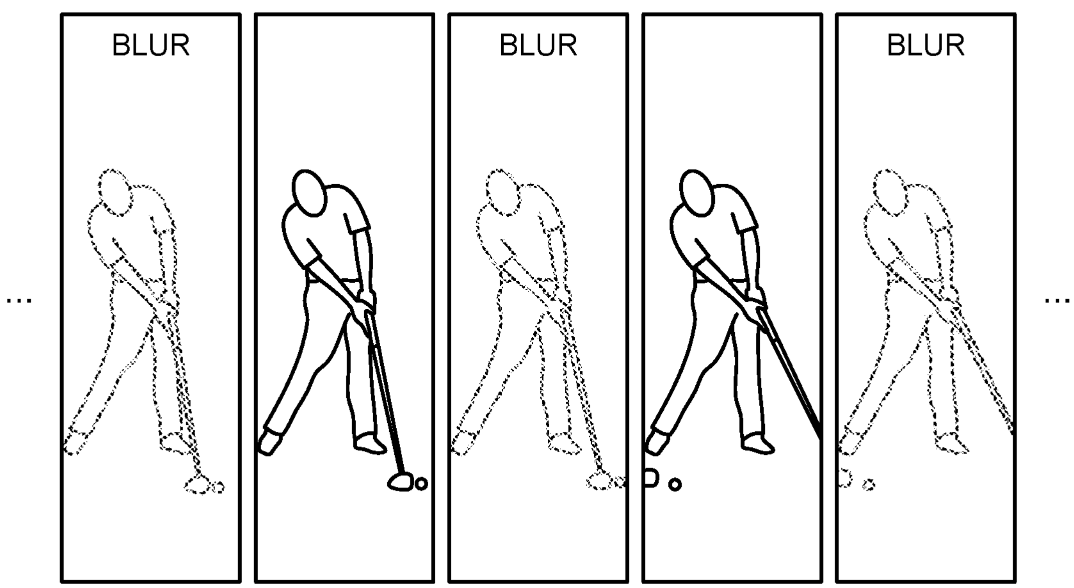
FIG. 12 is a view for describing Example 2 (part 1).

In the related art, when an RGB image for image diagnosis, machine learning, and inference is acquired, it is often the case that the image includes motion blur as illustrated, for example, in FIG. 12 due to motions of an image pickup system or motions of a subject. In image diagnosis, machine learning, and inference using such an RGB image with motion blur, a blurred subject makes it difficult to recognize the image, which may degrade accuracy of the diagnosis and the like and may increase the number of unproductive processes.

Therefore, this Example 2 proposes a method using event data from the EVS 200 for evaluating an RGB image based on an image signal from the RGB sensor 100 and selecting an image for image diagnosis, machine learning, and inference according to the evaluation. Hereinafter, an example of a procedure according to Example 2 will be described with reference to FIGS. 13 and 14.

This Example employs the information processing system 10 and the control unit 400 according to the embodiment of this disclosure.

Figure 13:
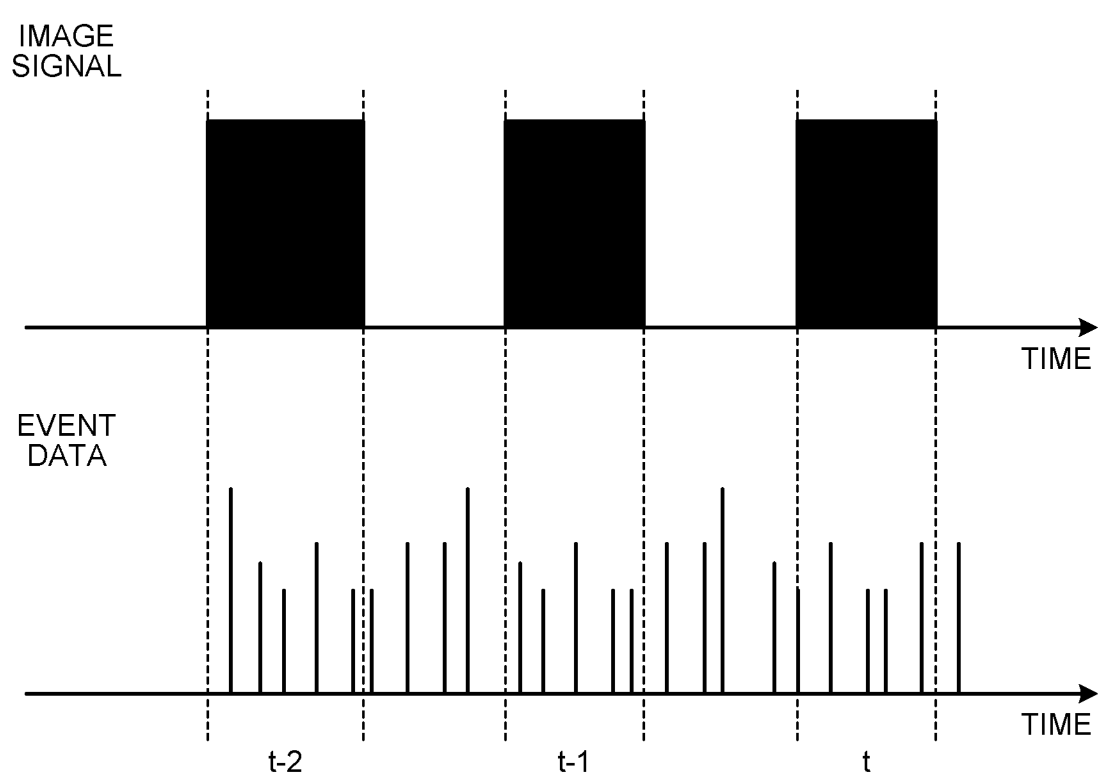
FIG. 13 is a view for describing Example 2 (part 2).

In this Example, as illustrated in FIG. 13, based on the number of pieces of event data (output frequency) (illustrated in the lower part of FIG. 13) output in time windows from when a shutter of the RGB sensor 100 is opened to when the shutter is closed (ranges indicated by black rectangles illustrated in the upper part of FIG. 13), the control unit 400 predicts a degree of motion blur attributed to motions of a subject in an RGB image obtained by an image signal acquired in each of the time windows.

Figure 14:
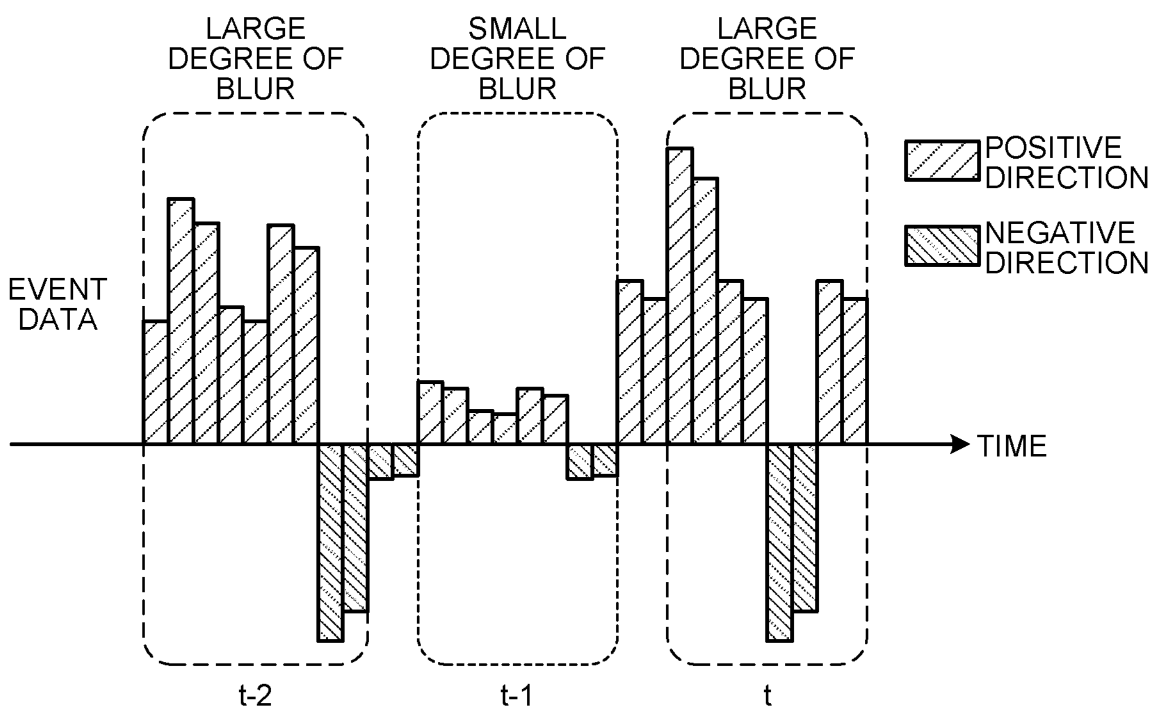
FIG. 14 is a view for describing Example 2 (part 3).

Specifically, herein, a change in luminance value increased up to a level equal to or more than a predetermined threshold is referred to as event data in a positive direction and a change in luminance value decreased to a level equal to or less than the predetermined threshold is referred to as event data in a negative direction. FIG. 14 illustrates the number of pieces of event data in the positive direction and event data in the negative direction detected during each time window (t−2, t−1, t) in which each RGB image is captured. In this Example, the control unit 400 predicts that the larger the number of pieces of the detected event data in the positive direction and in the negative direction, the higher the degree of motion blur. Based on the prediction, the control unit 400 evaluates a degree of blur of each RGB image in each time window. In this Example, note that the prediction of a degree of motion blur is not limited to a method using both event data in the positive direction and event data in the negative direction, and the prediction may be performed based on either one of them.

Furthermore, in this Example, the control unit 400 selects an RGB image predicted to have a small degree of predicted motion blur (the number of pieces of detected event data is smaller than a predetermined value) as an image for image diagnosis, machine learning, and inference. With this configuration, according to this Example, it is possible to avoid an increase in the number of unproductive processes while avoiding degradation in accuracy of diagnosis, machine learning, and inference based on an RGB image.

(Procedure)

Figure 15:
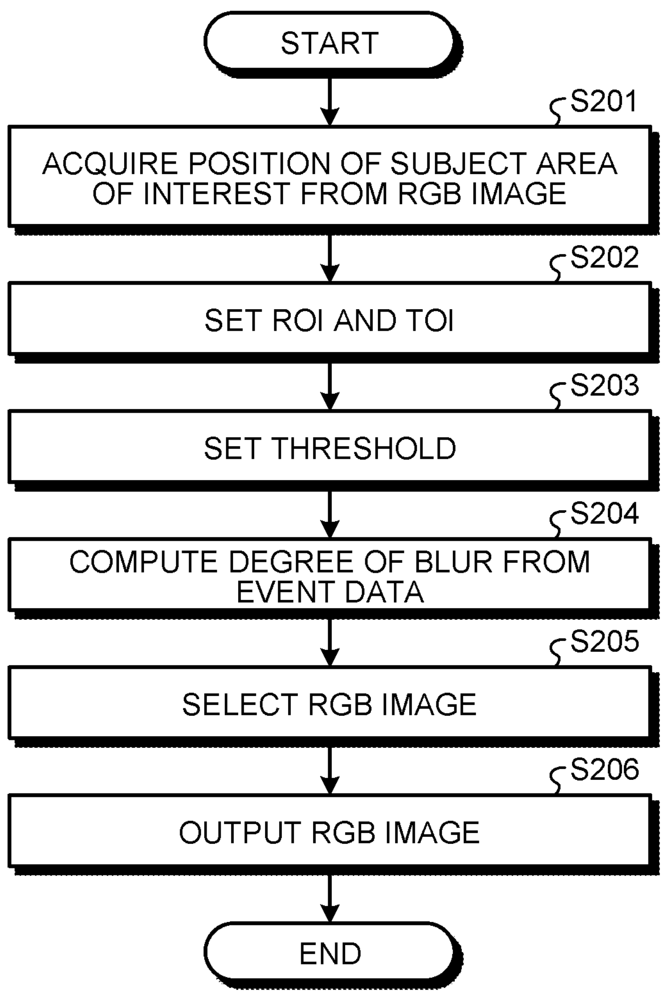
FIG. 15 is a flowchart illustrating a procedure according to Example 2.

Next, with reference to FIG. 15, a procedure of this Example will be described. FIG. 15 is a flowchart illustrating the procedure according to Example 2. As illustrated in FIG. 15, the procedure of this Example involves a plurality of steps from Step S201 to Step S206. Hereinafter, details of the steps will be described in sequence.

First, before starting the processing, the control unit 400 synchronizes times of timestamp information included in an image signal and event data.

Next, the control unit 400 executes the processing from Step S201 to Step S203 illustrated in FIG. 15, but these steps are similar to the steps from Step S101 to Step S103 of Example 1 illustrated in FIG. 9, and details of these steps will be omitted.

In addition, the control unit 400 acquires event data within ROI and TOI set in Step S202 and computes a degree of blur of a corresponding RGB image from the number of pieces of the acquired event data (Step S204). In this Example, ROI including a subject is preset, and event data within the ROI is used. Accordingly, even when the background which is not of interest has a luminance change, it is possible to avoid an influence of the change in the background. In a case where one RGB image includes a plurality of ROIs, a degree of blur may be computed for each ROI. Alternatively, one ROI may be subdivided and a degree of blur may be computed for each region.

Next, the control unit 400 selects whether to discard the corresponding RGB image based on the degree of blur computed in Step S204 (Step S205). Specifically, for example, when the computed degree of blur is equal to or less than a predetermined value, the control unit 400 selects the acquisition of the corresponding RGB image, and when the computed degree of blur is equal to or more than the predetermined value, the control unit 400 selects the discard of the corresponding RGB image. Accordingly, image diagnosis, machine learning, and inference are performed using an RGB image with a small degree of blur, thereby enhancing the accuracy of the diagnosis and the like.

The control unit 400 outputs the RGB image selected to be acquired in Step S205 (Step S206) and ends the processing. Note that the processing may repeat the steps from Step S201 to Step S205 until a required RGB image is output and may output RGB images collectively selected to be acquired. Alternatively, the steps from Step S201 to Step S206 may be repeated, and an RGB image selected to be acquired may be output in real time.

In this Example, note that the control unit 400 may perform feedback control on a sampling rate and sampling time (exposure time) of the RGB sensor 100 based on a predicted degree of blur. For example, predicting a large degree of blur, the control unit 400 decreases the sampling time of the RGB sensor 100, because a larger degree of blur indicates faster motions of the subject. Accordingly, it is possible to prevent generation of motion blur in a newly acquired RGB image, thereby enhancing the image quality. In addition, for example, based on the predicted degree of blur (output frequency of the event data), the control unit 400 may control the gain of the RGB sensor 100 or an illumination intensity of an illumination device (not illustrated) that irradiates the subject with light. In addition, according to this Example, the predicted degree of blur may be used for image diagnosis, machine learning, and inference.

Modification

The aforementioned Example 2 is also applicable to the evaluation of a blood flow. Specifically, an expected degree of blur is considered to reflect the speed of a blood flow, and the blood flow can be evaluated by the degree of blur. In this modification, each RGB image is divided into a plurality of sections. Based on the number of pieces of event data corresponding to each section, a degree of blur is computed, and the computed result may be mapped on each RGB image (for example, a maker having a hue corresponding to the degree of blur may be superimposed). In this modification, such mapping makes it possible to visually recognize the evaluation of a blood flow during a surgical operation or the like.

Furthermore, in this Example, an RGB image to be used is sorted out based on a predicted degree of motion blur, which enables prevention of an increase in data volume for image diagnosis, machine learning, and inference and also maintains the quality of the RGB image to be used. Still further, in this Example, motion blur in an RGB image is predicted using event data from the EVS 200, thereby enabling the prediction without performing special processing on the RGB image. Therefore, according to this Example, it is possible to avoid an increase in weight of the system, an increase in data volume, an increase in processing time, and an increase in power consumption.

3.3 Example 3

In sports (such as boxing and judo), a player may be injured by a shock applied to the body. For example, in a case where an area subjected to the shock is the head, even when observing the condition of the head right after the shock, it is difficult to understand the strength of the shock, and it may be difficult to diagnose appropriately. In this case, the player cannot receive appropriate treatment, which may leave aftereffects. A conceivable solution to this problem is to identify the strength of the impact by imaging motions of the player by the RGB sensor 100 during a match and by analyzing RGB images. However, in the aforementioned sports, a shock is applied in a fraction of a second, and it is difficult to estimate the shock accurately by RGB images.

Hereinafter described is Example 3 in which the embodiment of this disclosure is applied to accurate estimation of a shock applied to the body of a player. In this Example, a subject area of interest is the head of a boxer, and damage to the subject area of interest is to be estimated by a moving speed, a rotational speed, and deformation of the head.

(External Appearance of Smartphone 900)

Figure 16:
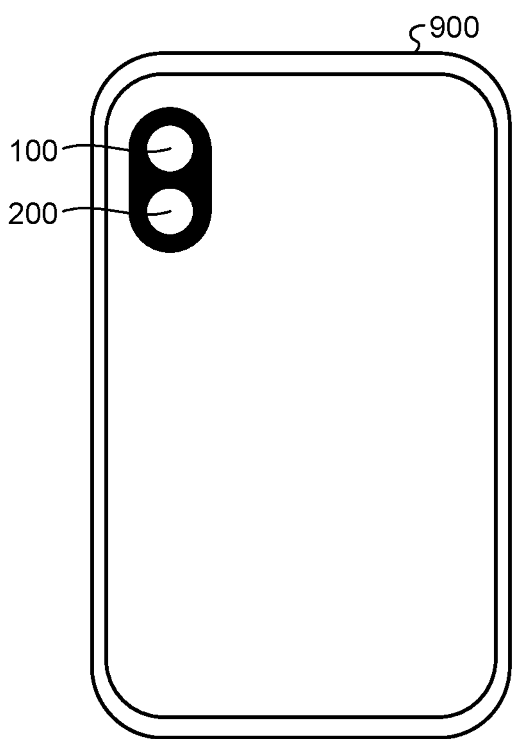
FIG. 16 is a view illustrating an exemplary external appearance of a smartphone 900 according to Example 3.

First, with reference to FIG. 16, an exemplary external appearance of a smartphone 900 used in this Example will be described. FIG. 16 is a view illustrating the exemplary external appearance of the smartphone 900 according to Example 3. In this Example, it is preferable to employ a portable device in order to make it easier to bring the device in a sports venue or the like. Specifically, the device used in this Example is one portable device which functions as the information processing system 10 according to the embodiment of this disclosure. Examples of the device include a personal video camera, a smartphone, and a tablet.

For example, in a case where the smartphone 900 is used, as illustrated in FIG. 16, the smartphone 900 includes the RGB sensor 100 and the EVS 200, and it is preferable that these members are arranged side by side. Alternatively, the smartphone 900 may have a structure in which incident light is guided into a housing of the smartphone 900 through one lens and the light is dispersed into the RGB sensor 100 and the EVS 200 inside the housing by a beam splitter or the like. In addition, in this Example, as described later, the smartphone 900 may include a ranging module (ToF sensor).

(Configuration of Smartphone 900)

Figure 17:
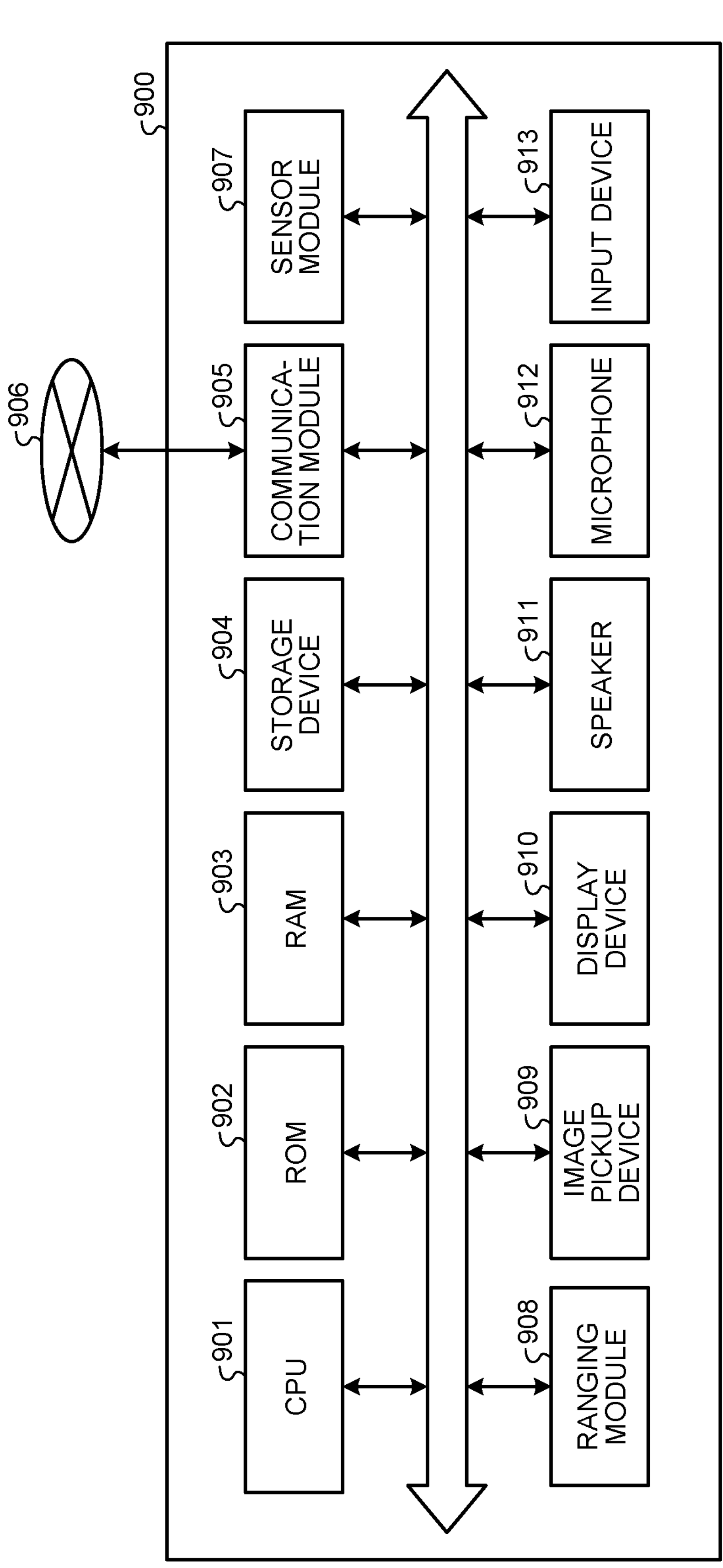
FIG. 17 is a block diagram illustrating an exemplary configuration of the smartphone 900 according to Example 3.

Next, with reference to FIG. 17, an exemplary configuration of the smartphone 900 according to Example 3 will be described. FIG. 17 is a block diagram illustrating the exemplary configuration of the smartphone 900 according to Example 3.

As illustrated in FIG. 17, the smartphone 900 includes a central processing unit (CPU) 901, a read only memory (ROM) 902, and a random access memory (RAM) 903. The smartphone 900 also includes a storage device 904, a communication module 905, and a sensor module 907. The smartphone 900 also includes, a ranging module 908, a display device 910, a speaker 911, a microphone 912, an input device 913, and a bus 914. In addition, the smartphone 900 includes an image pickup device 909 including the RGB sensor 100 and the EVS 200. The smartphone 900 may also have a processing circuit such as digital signal processor (DSP) in place of or in addition to the CPU 901.

The CPU 901 functions as an arithmetic processing device and a control device and controls all or part of operation of the smartphone 900 according to various programs stored in the ROM 902, RAM 903, or storage device 904. In other words, the CPU 901 can function as the control unit 400 according to the embodiment of this disclosure. The ROM 902 stores programs and arithmetic parameters used by the CPU 901. The RAM 903 primarily stores, for example, programs used in the execution of the CPU 901 and parameters that change appropriately during the execution. The CPU 901, ROM 902, and RAM 903 are connected to each other by the bus 914. The storage device 904 is an example of a storage unit in the smartphone 900 and is used for data store. The storage device 904 includes, for example, a magnetic storage device such as hard disk drive (HDD), a semiconductor storage device, and an optical storage device. This storage device 904 stores programs and various types of data executed by the CPU 901 and various types of data or the like acquired from the outside.

The communication module 905 is a communication interface including, for example, a communication device for connecting to a communication network 906. The communication module 905 may be, for example, a communication card for a wired or wireless local area network (LAN), Bluetooth (registered trademark), and wireless USB (WUSB). Alternatively, the communication module 905 may be a router for optical communications, a router for asymmetric digital subscriber line (ADSL), or a modem for various types of communications. The communication module 905 transmits and receives signals, for example, over the Internet or between other communications equipment using a predetermined protocol such as TCP/IP. In addition, the communication network 906 connected to the communication module 905 is a network connected in a wired or wireless manner, and examples of the communication network 906 include the Internet, a home network (LAN), infrared communications, and satellite communications.

The sensor module 907 includes various sensors such as motion sensor (for example, acceleration sensor, gyro sensor, and geomagnetic sensor), biometric sensor (for example, pulse sensor, blood pressure sensor, and fingerprint sensor), and positioning sensor (for example, receiver of a global navigation satellite system (GNSS)).

The ranging module 908 includes a ToF sensor and is disposed on a surface of the smartphone 900, and it is possible to acquire, for example, a distance to a subject opposing the surface and a three-dimensional shape of the subject as results of ranging.

The image pickup device 909 is disposed on the surface of the smartphone 900 and is configured to capture an image of an object or the like located around the smartphone 900. Specifically, the image pickup device 909 includes the RGB sensor 100 and the EVS 200.

The display device 910 is disposed on the surface of the smartphone 900, and examples of the display device 910 include a liquid crystal display (LCD) and an organic electro luminescence (EL) display. The display device 910 shows an operation screen and the image captured by the image pickup device 909.

The speaker 911 outputs to a user, for example, a voice call and a voice accompanying video content shown by the display device 910.

The microphone 912 collects, for example, a voice call of a user, a voice including a command for activating a function of the smartphone 900, and a voice in a surrounding environment of the smartphone 900.

The input device 913 is a device operated by a user, and examples of the input device 913 include a button, a keyboard, a touch panel, and a mouse. The input device 913 includes an input control circuit which generates an input signal based on information input by the user and outputs the signal to the CPU 901. The user operates this input device 913 to input various types of data to the smartphone 900 or give an operating instruction to the smartphone 900.

The configurations of the smartphone 900 illustrated in FIGS. 16 and 17 are examples, and the configuration of the smartphone 900 according to this Example is not limited to those illustrated in FIGS. 16 and 17.

(Procedure)

Figure 18:
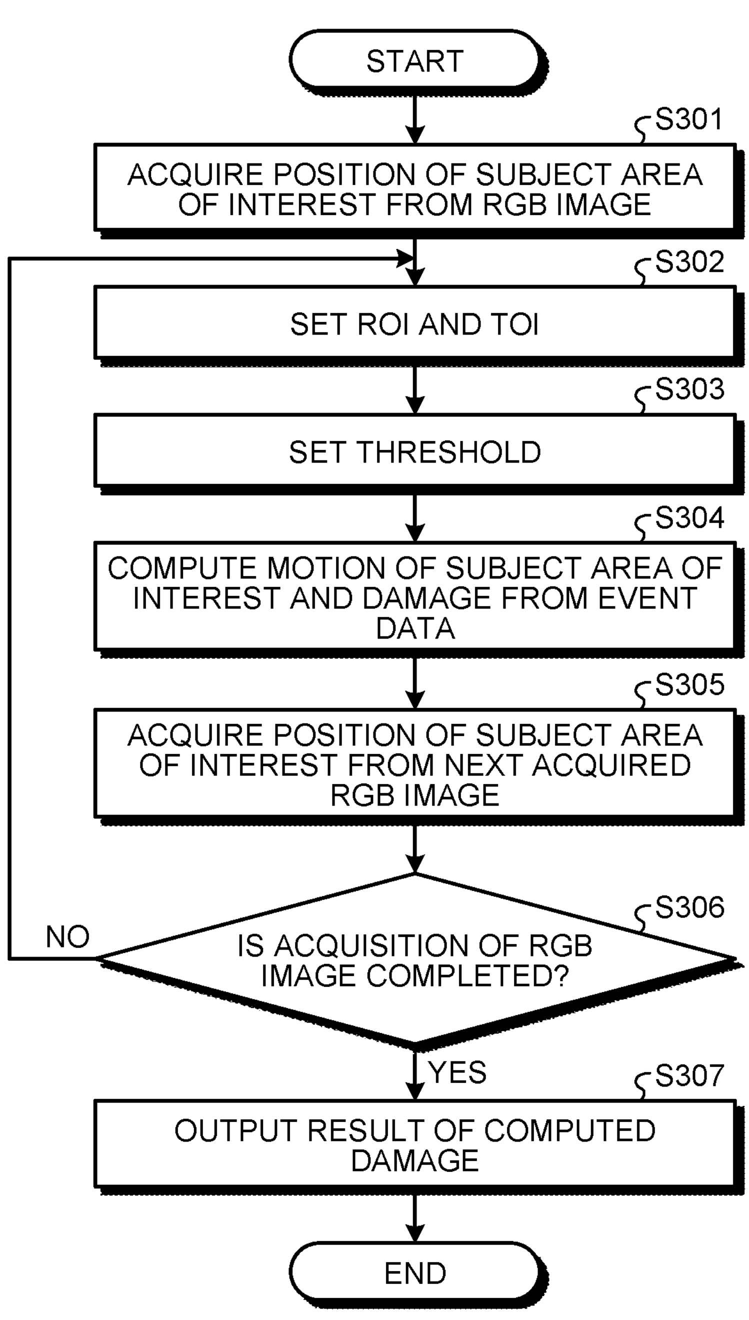
FIG. 18 is a flowchart illustrating a procedure according to Example 3.
Figure 19:
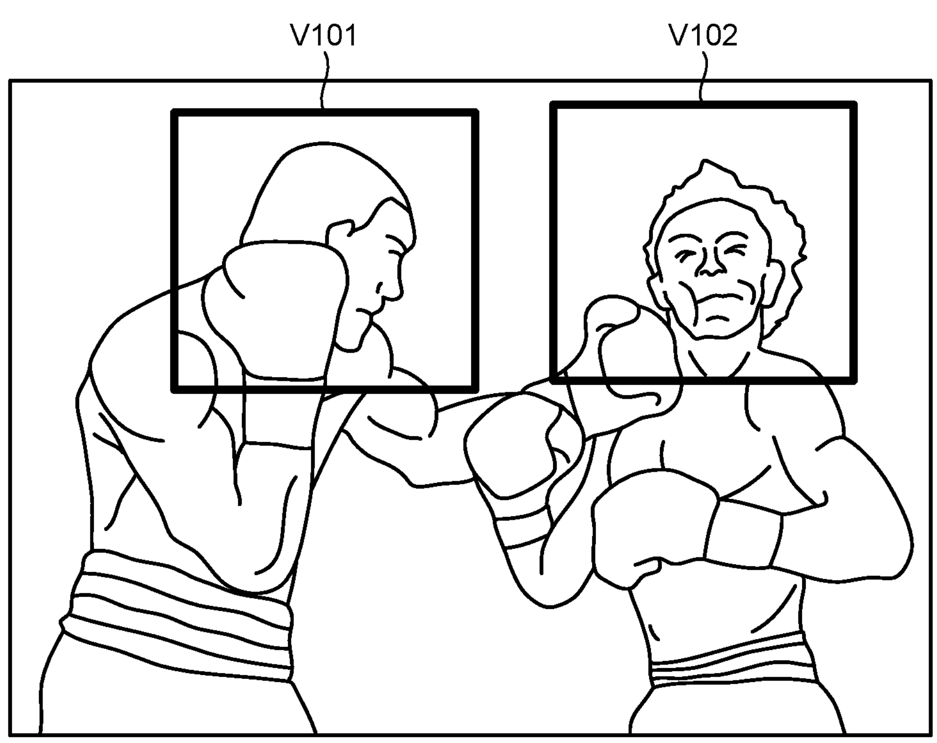
FIG. 19 is a view for describing Example 3.

Next, with reference to FIGS. 18 and 19, a procedure of this Example will be described. FIG. 18 is a flowchart illustrating the procedure according to Example 3, and FIG. 19 is a view for describing Example 3. As illustrated in FIG. 18, the procedure of this Example involves a plurality of steps from Step S301 to Step S307. Hereinafter, details of the steps will be described in sequence.

The smartphone 900 generates an RGB image as illustrated in FIG. 19 from an image signal acquired at a time t−1 and identifies the position of a subject area of interest (for example, the head of a player) from the generated RGB image (Step S301). In this Example, the subject area of interest may be identified by image recognition using a model obtained by machine learning or may be set by a direct input from a user.

Next, as illustrated in frames V101 and V102 of FIG. 19, the smartphone 900 sets a region including the subject area of interest within the RGB image as ROI of the EVS 200. Furthermore, based on a sampling rate (frame rate) of the RGB sensor 100, the smartphone 900 sets, as TOI of the EVS 200, a time window from the time t−1 to a time t at which the RGB sensor 100 acquires the next image signal (Step S302).

Next, the smartphone 900 executes Step S303, but details will be omitted since Step S303 is similar to Step S103 of Example 1 illustrated in FIG. 9.

Still further, the smartphone 900 acquires event data within the ROI and TOI set in Step S302 and computes motions (specifically, a moving speed, a rotation speed, and deformation of the head) of the subject area of interest from the acquired event data. Still further, the smartphone 900 computes damage to the head (current condition of the head) based on the computed result (Step S304).

Next, the smartphone 900 executes Step S305 and Step S306, but details of Step S305 and Step S306 will be omitted since they are similar to Step S105 and Step S106 of Example 1 illustrated in FIG. 9.

Next, the smartphone 900 outputs information associated with the damage computed in Step S304 (Step S307), thereby ending the processing.

In this Example, since ROI and TOI of the EVS 200 are set initially, it is possible to promote reduction in data volume of event data used for analysis, which enables reduction in processing time (enhancement in real-time processing) and suppression of power consumption, thereby providing such functions to the smartphone 900. Furthermore, in this Example, it is possible to accurately capture a moving speed, a rotation speed, and deformation of a subject area of interest based on event data from the EVS 200, thereby enabling accurate estimation of damage to the subject area of interest.

In addition, in this Example, a fixed object in an image that does not move (or does not shift) may be set as a subject area of interest. Since a motion of the fixed object is a motion of a camera, it is possible to evaluate changes in moving speed and rotation speed and deformation of the head more accurately.

This Example is applicable to impact evaluation for any athlete as well as a boxer.

3.4 Example 4

Hereinafter described is Example 4 in which the embodiment of this disclosure is applied to a tracking device that tracks a launched golf ball. In this Example, an initial velocity, direction, and spin rate of a golf ball are computed based on event data from the EVS 200, and based on the computed results, a trajectory of the ball is calculated, and a carry and a landing spot of the ball are computed, thereby presenting a player with the obtained carry and the landing spot. In this Example, the landing spot which is difficult to predict is presented to the player by capturing the behavior of the ball at the moment of a shot with the EVS 200 capable of capturing with high time resolution a minute change of a subject as needed.

(External Appearance of Tracking Device 10*c*)

Figure 20:
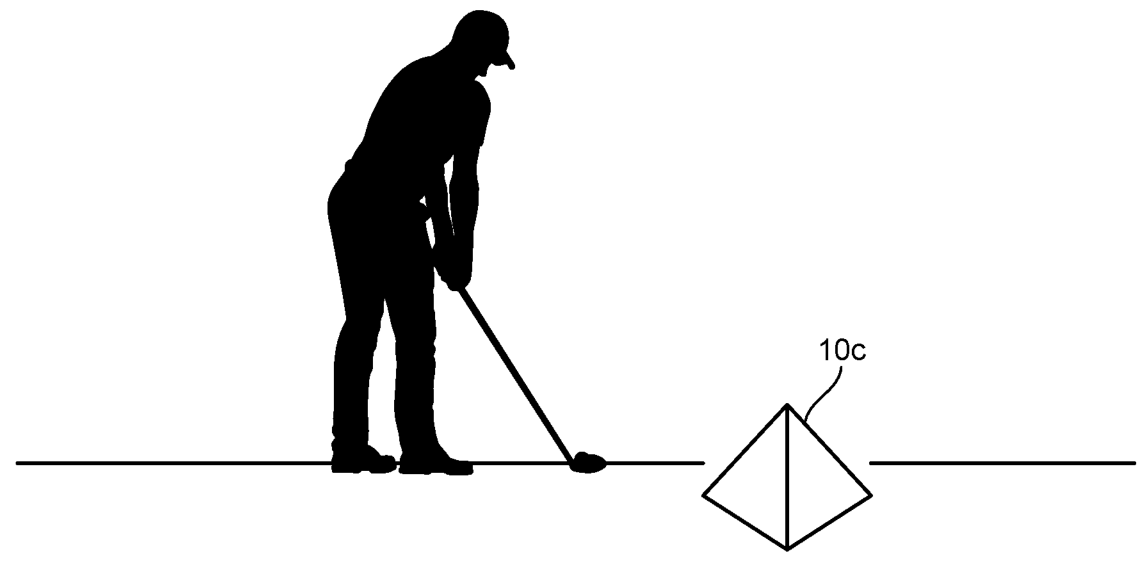
FIG. 20 is a view illustrating an exemplary external appearance of a tracking device 10*c* according to Example 4.

First, with reference to FIG. 20, an exemplary external appearance of a tracking device 10*c* used in this Example will be described. FIG. 20 is a view illustrating the exemplary external appearance of the tracking device 10*c* according to Example 4. As illustrated in FIG. 20, the tracking device 10*c* is placed in front of a ball each time the ball is to be launched during a round of golf. The tracking device 10*c* may also include a flying mechanism (not illustrated) and may move to a place designated by a player, to a position of the player, or to a predicted landing spot of the ball.

In this Example, note that the external appearance of the tracking device 10*c* is not particularly limited to one illustrated in FIG. 20 as long as the tracking device 10*c* can be movably installed in a golf course.

(Configuration of Tracking Device 10*c*)

Figure 21:
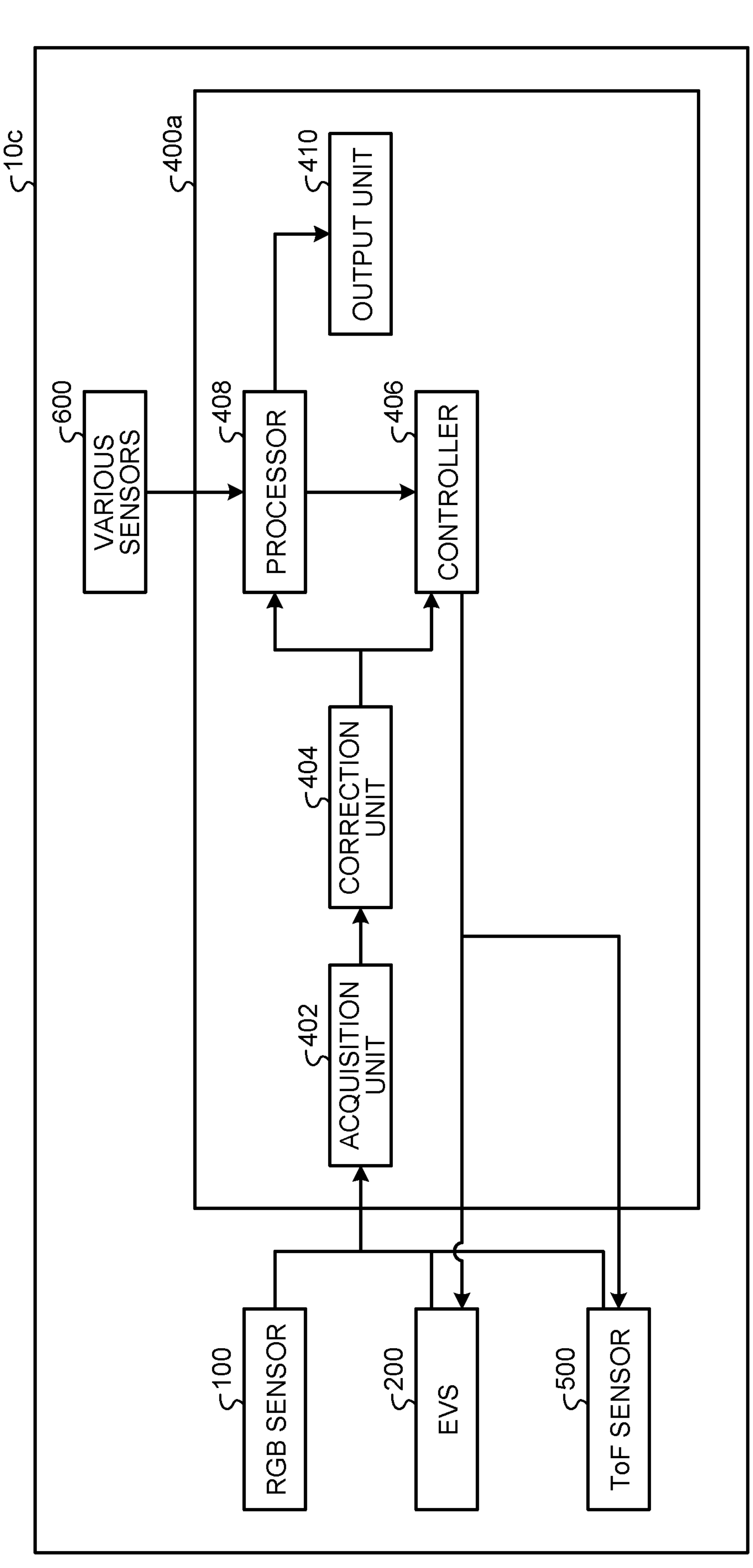
FIG. 21 is a block diagram illustrating an exemplary configuration of the tracking device 10*c* according to Example 4.

Next, with reference to FIG. 21, a functional configuration of the tracking device 10*c* according to this Example will be described. FIG. 21 is a block diagram illustrating an exemplary configuration of the tracking device 10*c* according to Example 4. The tracking device 10*c* according to this Example has a configuration capable of functioning as the information processing system 10 according to the embodiment of this disclosure.

Specifically, as illustrated in FIG. 21, the tracking device 10*c* includes the RGB sensor 100, and the EVS 200, and a control unit 400. As similar to the control unit 400 according to the embodiment of this disclosure, a control unit 400*a* includes the acquisition unit 402, the correction unit 404, the controller 406, the processor 408, and the output unit 410 as main components. The tracking device 10*c* also includes a ToF sensor 500 and various sensors (third sensor) 600. Hereinafter, details of the functional units of the tracking device 10*c* will be described in sequence, but those common to the embodiment of this disclosure will be omitted.

The ToF sensor 500 irradiates a subject (specifically, a ball) with pulsed light and performs ranging by a reflection time of the pulsed light from the subject, thereby detecting a distance to the subject and an outer shape of the subject.

The various sensors 600 includes, for example, a positioning sensor, a temperature sensor, a wind direction and wind force sensor, an atmospheric pressure sensor, a gyro sensor (inclination sensor), a biometric sensor (for detecting biological information (such as pulse) of a player), and a microphone (for detecting the sound of wind, for example, to estimate a wind force). In addition, in this Example, the control unit 400*a* may acquire characteristic information of the player (such as gender, age, muscle mass, and physique) and information such as map, shape, and slope of a golf course and condition of the turf.

(Procedure)

Figure 22:
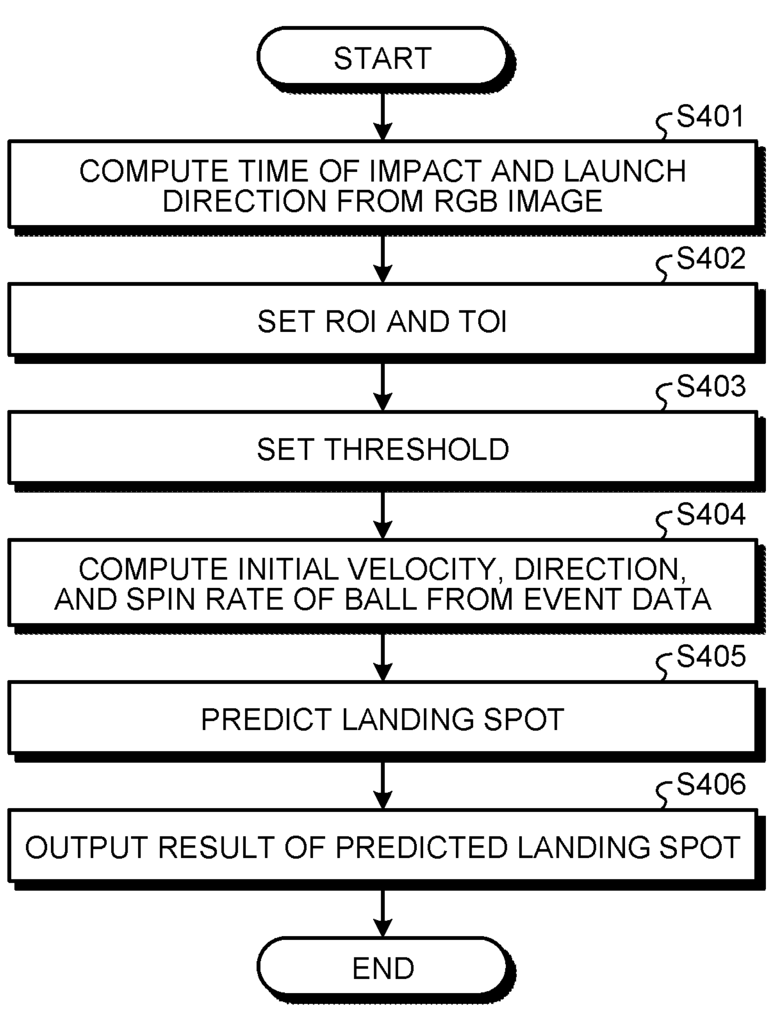
FIG. 22 is a flowchart illustrating a procedure according to Example 4.

Next, with reference to FIG. 22, a procedure of this Example will be described. FIG. 22 is a flowchart illustrating the procedure according to Example 4. As illustrated in FIG. 22, the procedure of this Example involves a plurality of steps from Step S401 to Step S406. Hereinafter, details of the steps will be described in sequence.

The tracking device 10*c* generates an RGB image from an image signal obtained by the RGB sensor 100 and detects motions of a player such as takeaway, top of the backswing, and downswing from the generated RGB image, thereby computing a time of impact (shot) in advance. Furthermore, the tracking device 10*c* computes a ball launch direction based on positional relations between the ball, the player, and the golf club obtained from the RGB image (Step S401).

Next, the tracking device 10*c* sets ROI and TOI of the EVS 200 based on the computed result obtained in Step S401 (Step S402). For example, the ROI includes the golf ball and a space extended in the launch direction of the club head at impact of the golf ball. In addition, for example, the TOI includes times before and after the impact of the golf ball.

Next, based on a luminance value of the golf ball in the RGB image, the tracking device 10*c* predicts a change in luminance value and sets a threshold (predetermined threshold) used for a comparison with the change in luminance value in the EVS 200 (Step S403).

Next, the tracking device 10*c* acquires event data within the ROI and TOI set in Step S402 and computes an initial velocity, direction, and spin rate of the launched ball from the acquired event data (Step S404).

The tracking device 10*c* uses the initial velocity, direction, and spin rate of the ball computed in Step S404 to calculate a trajectory, thereby predicting a carry. In addition, the tracking device 10*c* uses position information from the positioning sensor to predict a landing spot of the ball (Step S405). For the prediction, the tracking device 10*c* may use sensing data (such as wind direction and wind force) acquired from the various sensors 600 and may also use the characteristic information of the player. Accordingly, it is possible to enhance accuracy of the prediction.

The tracking device 10*c* outputs to the player the predicted carry and landing spot (Step S406). This is the end of the processing. Note that the output may be done by mapping, or the tracking device 10*c* itself may fly to the landing spot. Furthermore, in this Example, the tracking device 10*c* may perform form diagnosis by analyzing images captured from the address to the follow-through of the player. In addition, the tracking device 10*c* may output such images and diagnosis results together with the landing spot.

In this Example, since an initial velocity, direction, and spin rate (change) of a ball are accurately computed using event data from the EVS 200, it is possible to accurately predict a trajectory, carry, and landing spot of the ball. In addition, in this Example, event data within preset ROI and TOI are analyzed, thereby enabling prevention of an increase in data volume. Therefore, according to this Example, it is possible to prevent increases in processing time, processing load, and power consumption, and it is possible to analyze and provide a landing spot in real time by the tracking device 10*c* having a simple configuration.

This Example is not limited to the prediction of a landing spot of a golf ball and may predict a landing spot of a ball used in other sports. In addition, according to this Example, since a possible condition of a user or a subject operated by a user can be estimated, this Example may be applied to acquisition of sport skills or instrumental skills.

4. Summary

As described above, according to the embodiment of this disclosure, it is possible to reduce a data volume of an image and the like used for analysis.

5. Hardware Configuration

Figure 23:
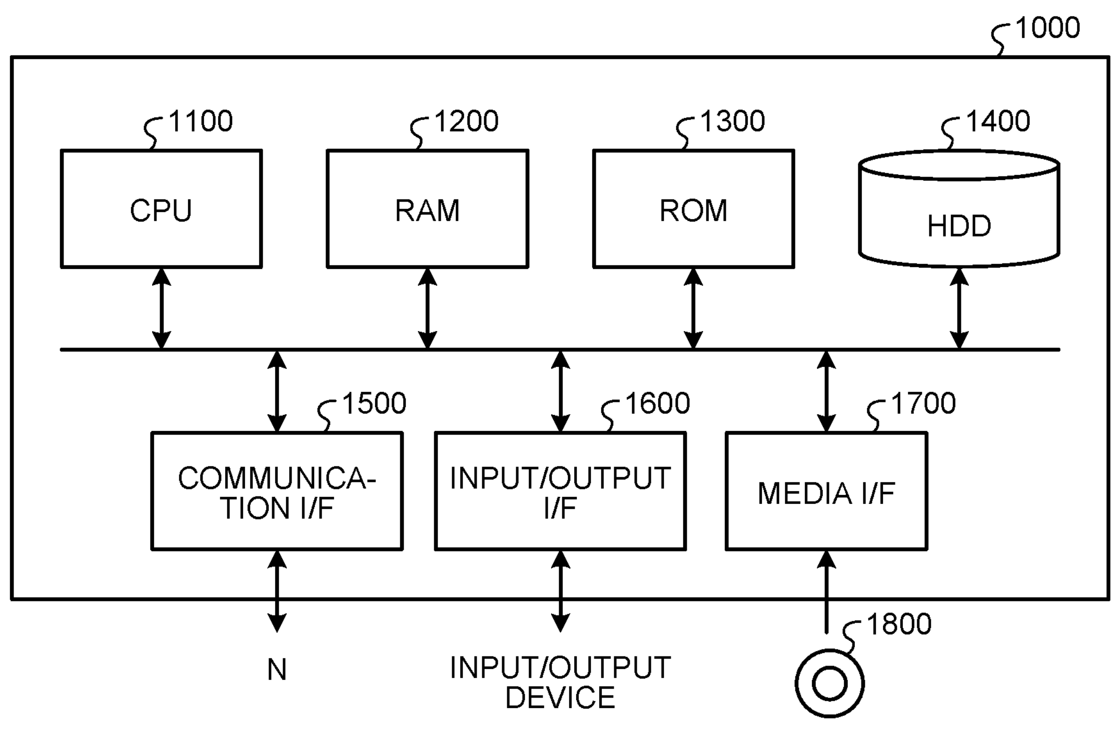
FIG. 23 is a hardware configuration diagram illustrating an example of a computer that executes functions of the control unit 400.

The control unit 400 according to the embodiment is executed by, for example, a computer 1000 having a configuration illustrated in FIG. 23. FIG. 23 is a hardware configuration diagram illustrating an example of a computer that executes functions of the control unit 400. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on programs stored in the ROM 1300 or the HDD 1400 and controls each unit. The ROM 1300 stores a boot program executed by the CPU 1100 when booting the computer 1000 and programs depending on hardware of the computer 1000.

The HDD 1400 stores programs executed by the CPU 1100 and data or the like used by the programs. The communication interface 1500 receives data from other equipment over a predetermined communication network, sends the data to the CPU 1100, and transmits data generated by the CPU 1100 to the equipment over the predetermined communication network.

The CPU 1100 controls output devices such as display and printer and input devices such as keyboard and mouse through the input/output interface 1600. The CPU 1100 acquires data from the input devices through the input/output interface 1600. Furthermore, the CPU 1100 outputs generated data to the output devices through the input/output interface 1600.

The media interface 1700 reads programs or data stored in a recording medium 1800 and provides the programs and data to the CPU 1100 through the RAM 1200. Through the media interface 1700, the CPU 1100 loads the programs from the recording medium 1800 into the RAM 1200 and executes the loaded programs. Examples of the recording medium 1800 include an optical recording medium such as digital versatile disc (DVD) and phase change rewritable disk (PD), a magneto-optical recording medium such as magneto-optical disk (MO) and also include a tape recording medium, a magnetic recording medium, and a semiconductor memory.

For example, in a case where the computer 1000 functions as the control unit 400 according to the embodiment, the CPU 1100 of the computer 1000 executes the programs loaded into the RAM 1200 to allow the acquisition unit 402, the correction unit 404, controller 406, processor 408, output unit 410, and the like to function. The CPU 1100 of the computer 1000 reads these programs from the recording medium 1800 and executes the programs. As another example, the CPU 1100 may acquire these programs from other devices over a predetermined communication network.

Furthermore, the HDD 1400 stores the programs and data or the like according to the embodiment of this disclosure.

6. Supplement

It should be noted that the aforementioned embodiment of this disclosure may include, for example, a method for processing information executed by the information processing system 10 as described above, a program for causing the information processing system 10 to function, and a non-transitory medium in which the program is recorded. In addition, the program may be distributed through a communication line such as the Internet (including wireless communications).

In addition, the steps in the processing of the embodiment of this disclosure are not necessarily processed in the described order. For example, the order of the steps may be changed appropriately. In addition, the steps may be partially processed in parallel or individually instead of being processed on a time-series basis. Furthermore, the steps are not necessarily processed according to the described method and may processed, for example, by another method by other functional units.

In the processing described in each embodiment, the whole or a part of the processing described as being automatically performed can be manually performed, or the whole or a part of the processing described as being manually performed can be automatically performed by a known method. In addition, the procedures, specific names, and information including various data and parameters illustrated in this document and the drawings can be changed unless otherwise specified. For example, the various types of information illustrated in the drawings are not limited to the illustrated information.

In addition, components of the devices illustrated in the drawings are functional concepts and are not necessarily physically configured as illustrated in the drawings. In other words, specific forms of disassembled or assembled devices are not limited to those illustrated in the drawings, and all or part thereof can be functionally or physically disassembled or assembled in any unit depending on various loads and use conditions.

Furthermore, the effects described in this specification are for purposes of illustration or exemplification and not limitation. In other words, in addition to or in place of the effects, the techniques according to this disclosure may exhibit other effects which are apparent to those skilled in the art from the description herein.

Although the preferred embodiments of this disclosure have been described in detail with reference to the accompanying drawings, the technical scope of this disclosure is not limited to such examples. It is clear that a person having common knowledge of the technical field of this disclosure can conceive various changes or modifications within the scope of the technical idea in the claims, and it is naturally understood that the changes or modifications also belong to the technical scope of this disclosure.

The present technology may also have the following configurations.

(1) An information processing apparatus comprising:
a controller configured to control one of a first sensor and a second sensor based on sensing data output from the other, the first sensor being configured to detect light emitted from an object and the second sensor being configured to detect a change in luminance value of the light as an event; and a processor configured to process the sensing data output from the first sensor or the second sensor.

(2) The information processing apparatus according to (1), wherein
the second sensor includes
a pixel array unit having a plurality of pixels arranged in a matrix, and
an event detector configured to detect that a luminance change exceeds a predetermined threshold in each pixel.

(3) The information processing apparatus according to (2), wherein the first sensor includes an image sensor.

(4) The information processing apparatus according to (3), wherein the controller controls a region of interest of the second sensor based on a range including the object within an image generated from first sensing data output from the first sensor.

(5) The information processing apparatus according to (4), wherein the controller controls the predetermined threshold of the second sensor based on a luminance value of the object or of the range within the image.

(6) The information processing apparatus according to (4) or (5), wherein the controller selects second sensing data output from the second sensor to the processor, based on a sampling time and a sampling rate of the first sensing data.

(7) The information processing apparatus according to (6), wherein the processor estimates a condition of the object or a condition of the image, based on a plurality of pieces of the second sensing data.

(8) The information processing apparatus according to (7), wherein the processor estimates a motion of the object based on the plurality of pieces of the second sensing data.

(9) The information processing apparatus according to (2), wherein the first sensor includes an RGB sensor or a ToF sensor.

(10) The information processing apparatus according to (9), wherein the controller controls a region of interest of the first sensor based on second sensing data output from the second sensor.

(11) The information processing apparatus according to (10), wherein the controller controls a sampling time, sampling rate, and gain of the first sensor or an illumination intensity of an illumination device that irradiates the object with light, based on an output frequency of the second sensing data.

(12) The information processing apparatus according to (10) or (11), wherein the controller selects first sensing data output from the first sensor to the processor, based on an output frequency of the second sensing data.

(13) The information processing apparatus according to (12), wherein the processor analyzes an image generated from the first sensing data and estimates a condition of the object.

(14) The information processing apparatus according to any one of (1) to (13), wherein the processor processes sensing data of a third sensor.

(15) The information processing apparatus according to (14), wherein the third sensor includes at least one of a positioning sensor, a biometric sensor, a temperature sensor, a wind direction and wind force sensor, and an inclination sensor.

(16) The information processing apparatus according to any one of (1) to (15), further comprising: a correction unit configured to correct a deviation in the sensing data between the first sensor and the second sensor, based on a positional relation and an optical difference between the first sensor and the second sensor.

(17) The information processing apparatus according to (16), wherein the correction unit corrects a difference in at least one of angle of view, parallax, lens aberration, and distance to the object.

(18) An information processing system comprising:
- a first sensor configured to detect light emitted from an object;
- a second sensor configured to detect a change in luminance value of the light as an event; and
- an information processing apparatus,
- the information processing apparatus including
- a controller configured to control one of the first sensor and the second sensor based on sensing data output from the other, and
- a processor configured to process the sensing data output from the first sensor or the second sensor.

(19) A method for processing information by an information processing apparatus, the method comprising:
- controlling one of a first sensor and a second sensor based on sensing data output from the other, the first sensor being configured to detect light emitted from an object and the second sensor being configured to detect a change in luminance value of the light as an event; and
- processing the sensing data output from the first sensor or the second sensor.

REFERENCE SIGNS LIST

1 MEDICAL IMAGE GENERATION SYSTEM
10, 10*a* INFORMATION PROCESSING SYSTEM
10*c* TRACKING DEVICE
100 RGB SENSOR
150, 160, 250 LENS
170 BEAM SPLITTER
200 EVS
211 DRIVE CIRCUIT
212 SIGNAL PROCESSOR
213 ARBITER
214 COLUMN PROCESSOR
300 PIXEL ARRAY UNIT
302 PIXEL
304 LIGHT RECEIVING UNIT
306 PIXEL SIGNAL GENERATOR
308 DETECTOR
400, 400*a* CONTROL UNIT
402 ACQUISITION UNIT
404 CORRECTION UNIT
406 CONTROLLER
408 PROCESSOR
410 OUTPUT UNIT
500 TOF SENSOR
600 VARIOUS SENSORS
900 SMARTPHONE
901 CPU
902 ROM
903 RAM
904 STORAGE DEVICE
905 COMMUNICATION MODULE
906 COMMUNICATION NETWORK
907 SENSOR MODULE
908 RANGING MODULE
909 IMAGE PICKUP DEVICE
910 DISPLAY DEVICE
911 SPEAKER
912 MICROPHONE
913 INPUT DEVICE
914 BUS

The invention claimed is:

1. An information processing apparatus, comprising:
a Central Processing Unit (CPU) configured to:
correct a deviation between first sensing data and second sensing data, based on a positional relation between a first sensor and a second sensor and an optical difference between the first sensor and the second sensor, wherein
the first sensing data is output from the first sensor, and
the second sensing data is output from the second sensor;
control, based on the correction of the deviation, one of the first sensor or the second sensor, wherein
the second sensor is controllable based on the first sensing data output from the first sensor,
the first sensor is controllable based on the second sensing data output from the second sensor,
the first sensor detects light emitted from an object, and
the second sensor detects a change in a luminance value of the light as an event; and
process one of the first sensing data or the second sensing data.

2. The information processing apparatus according to claim 1, wherein
the second sensor includes:
a plurality of pixels in a matrix; and
a detector circuit that detects, in each pixel of the plurality of pixels, that a luminance change exceeds a specific threshold.

3. The information processing apparatus according to claim 2, wherein the first sensor includes an image sensor.

4. The information processing apparatus according to claim 3, wherein the CPU is further configured to:
control a region of interest of the second sensor based on a range, including the object, within an image generated from the first sensing data.

5. The information processing apparatus according to claim 4, wherein the CPU is further configured to:
control the specific threshold of the second sensor based on one of a luminance value of the object or the range within the image.

6. The information processing apparatus according to claim 4, wherein the CPU is further configured to:
select the second sensing data, based on a sampling time of the first sensing data and a sampling rate of the first sensing data.

7. The information processing apparatus according to claim 6, wherein the CPU is further configured to:
estimate one of a condition of the object or a condition of the image, based on a plurality of pieces of the second sensing data.

8. The information processing apparatus according to claim 7, wherein the CPU is further configured to estimate a motion of the object based on the plurality of pieces of the second sensing data.

9. The information processing apparatus according to claim 2, wherein the first sensor includes at least one of an RGB sensor or a time-of-flight (ToF) sensor.

10. The information processing apparatus according to claim 9, wherein the CPU is further configured to:
control a region of interest of the first sensor based on the second sensing data.

11. The information processing apparatus according to claim 10, wherein the CPU is further configured to:

control a sampling time, sampling rate, and one of a gain of the first sensor or an illumination intensity of an illumination device that irradiates the object with the light, based on an output frequency of the second sensing data.

12. The information processing apparatus according to claim 10, wherein the CPU is further configured to select the first sensing data, based on an output frequency of the second sensing data.

13. The information processing apparatus according to claim 12, wherein the CPU is further configured to:

analyze an image generated from the first sensing data; and estimate a condition of the object.

14. The information processing apparatus according to claim 1, wherein the CPU is further configured to process third sensing data of a third sensor.

15. The information processing apparatus according to claim 14, wherein the third sensor includes at least one of a positioning sensor, a biometric sensor, a temperature sensor, a wind direction and wind force sensor, or an inclination sensor.

16. The information processing apparatus according to claim 1, wherein the CPU is further configured to correct a difference in at least one of an angle of view, parallax, lens aberration, or a distance to the object.

17. An information processing system, comprising:

a first sensor configured to:

detect light emitted from an object; and output first sensing data based on the detection of the light;

a second sensor configured to:

detect a change in a luminance value of the light as an event; and output second sensing data based on the detection of the change in the luminance value; and an information processing apparatus comprising a Central Processing Unit (CPU), wherein the CPU is configured to:

correct a deviation between the first sensing data and the second sensing data, based on a positional relation between the first sensor and the second sensor and an optical difference between the first sensor and the second sensor;

control, based on the correction of the deviation, one of the first sensor or the second sensor, wherein the second sensor is controllable based on the first sensing data output from the first sensor, and the first sensor is controllable based on the second sensing data output from the second sensor; and process one of the first sensing data or the second sensing data.

18. A method for processing information by an information processing apparatus, the method comprising:

correcting a deviation between first sensing data and second sensing data, based on a positional relation between a first sensor and a second sensor and an optical difference between the first sensor and the second sensor, wherein the first sensing data is output from the first sensor, and the second sensing data is output from the second sensor;

controlling, based on the correction of the deviation, one of the first sensor or the second sensor, wherein the second sensor is controllable based on the first sensing data output from the first sensor, the first sensor is controllable based on the second sensing data output from the second sensor, the first sensor detects light emitted from an object, and the second sensor detects a change in a luminance value of the light as an event; and processing one of the first sensing data or the second sensing data.

* * * * *